(12) United States Patent
Xu

(10) Patent No.: US 11,787,028 B2
(45) Date of Patent: Oct. 17, 2023

(54) QUICK FASTENING DEVICE

(71) Applicant: UNIWISDOM TECHNOLOGY (SUZHOU) CO., LTD, Suzhou (CN)

(72) Inventor: Ying Xu, Dongguan (CN)

(73) Assignee: UNIWISDOM TECHNOLOGY (SUZHOU) CO., LTD, Suzhou (CN)

( * ) Notice: Subject to any disclaimer, the term of this patent is extended or adjusted under 35 U.S.C. 154(b) by 476 days.

(21) Appl. No.: 17/033,969

(22) Filed: Sep. 28, 2020

(65) Prior Publication Data

US 2021/0114191 A1    Apr. 22, 2021

(30) Foreign Application Priority Data

Oct. 18, 2019   (CN) .......................... 201921760241.0

(51) Int. Cl.
*B25C 1/04*       (2006.01)
*F16H 19/02*      (2006.01)
*F16H 19/06*      (2006.01)

(52) U.S. Cl.
CPC ............. *B25C 1/047* (2013.01); *F16H 19/02* (2013.01); *F16H 19/0622* (2013.01); *F16H 2019/0686* (2013.01)

(58) Field of Classification Search
CPC . B25C 1/047; B25C 1/06; F16H 19/02; F16H 19/0622; F16H 2019/0686
See application file for complete search history.

(56) References Cited

U.S. PATENT DOCUMENTS 8,887,831 B2 *   11/2014   Zhang .................... B25F 5/001
                                                       74/393
2020/0147774 A1*   5/2020   Shi ........................... B25C 7/00

* cited by examiner

*Primary Examiner* — Anna K Kinsaul
*Assistant Examiner* — Veronica Martin
(74) *Attorney, Agent, or Firm* — Flaster Greenberg, P.C.

(57) ABSTRACT

A quick fastening device, which comprises an energy storage medium, an impact unit, and a driving mechanism; the driving mechanism comprises a fixed sun gear, an output shaft not linked to the sun gear, a crank fixed on the upper end of the output shaft, a planetary gear installed on the crank in a spinning manner and capable of revolving around the sun gear as the crank rotates, and a connecting rod module mounted on the upper end of the planetary gear and connected to the impact unit. A linkage element is arranged between the planetary gear and the sun gear for driving the planetary gear to rotate in a direction opposite to the direction in which the planetary gear revolves relative to the sun gear.

15 Claims, 22 Drawing Sheets

QUICK FASTENING DEVICE

CROSS-REFERENCE TO RELATED APPLICATION

This application claims priority to Chinese Patent Application No. 201921760241.0 filed Oct. 18, 2019, the entire contents of which are incorporated herein by reference.

BACKGROUND OF INVENTION

1. Field of the Invention

The present invention relates to the technical field of mechanical tool products, in particular to a quick fastening device.

2. Description of Related Art

For a quick fastening machine (e.g., a nail gun), it is usually necessary to compress an energy storage medium (e.g., gas, spring, and rubber, etc.) to store energy, and then quickly release it to do work to the outside.

In addition, the common driving mechanism converts a rotational motion into a reciprocating motion, and its structure is a crank-connecting rod structure. However, in the process of motion when such a structure encounters a force, it will produce a large deflection angle, that is, the swing angle of the connecting rod. If the deflection angle is too large, the friction force of the load (impact unit) in motion will be increased and cause the mechanism to wear out, resulting in the service life of the product not guaranteed.

How to make the driving mechanism after compressing the energy storage medium release quickly has become a difficulty in the design of such mechanical equipment.

In view of this, this invention proposes the following technical solutions.

SUMMARY OF THE INVENTION

In view of the above disadvantages, the technical issue to be resolved by the present invention is to provide a quick fastening device, comprising
  an energy storage medium, and an impact unit that is connected to the energy storage medium to push the compressed storage medium of the impact unit as a driving mechanism for energy storage;
  wherein the driving mechanism includes a fixed sun gear, an output shaft not linked to the sun gear, a crank fixed on the upper end of the output shaft, a planetary gear installed on the crank in a spinning manner and capable of revolving around the sun gear as the crank rotates, and a connecting rod module mounted on the upper end of the planetary gear and connected to the impact unit;
  a linkage element is arranged between the planetary gear and the sun gear for driving the planetary gear to rotate in a direction opposite to the direction in which the planetary gear revolves relative to the sun gear.

More particularly, wherein the angle of rotation and the angle of revolution of the planetary gear are the same.

More particularly, wherein the ratio of the reference diameter of the sun gear to the reference diameter D2 of the planetary gear can be 2:1.

More particularly, wherein the linkage element is an idler gear; the idler gear (4) can be installed on the crank in a self-rotating manner, and is located between the sun gear and the planetary gear; the idler gear meshes with the sun gear and the planetary gear.

More particularly, wherein the linkage element can also be a belt or a chain; the belt or the chain surrounds the sun gear and the planetary gear.

More particularly, wherein the connecting rod module comprises a connecting rod mounted on the upper end of the planetary gear; the connecting rod is provided with an engagement shaft; the engagement shaft (352) is connecting to the impact unit.

More particularly, wherein the connecting rod module comprises a connecting rod fixed to the upper end of the planetary gear and linked with the planetary gear, and a swing rod mounted on the upper end of the connecting rod and rotatable relative to the connecting rod; the swing rod is provided with an engagement shaft.

More particularly, wherein it comprises a disengagement assembly for driving the impact unit to disengage with the engagement shaft.

More particularly, the disengagement assembly comprises a first rotation shaft and a disengagement block mounted on the upper end of the first rotation shaft; or, the disengagement assembly comprises a first rotation shaft and a disengagement block integrally fixed to the upper end of the first rotation shaft.

More particularly, wherein the impact unit is an impact rod; and the side of the impact rod is provided with a groove; the engagement shaft is placed in the groove to form a connection; or the side of the impact rod is provided with a bulge, and the engagement shaft abuts against the bulge to form a connection.

More particularly, wherein the ratio of the reference diameter of the sun gear to that of the planetary gear is (3:1)-(8:1), or the ratio of the reference diameter of the sun gear to the reference diameter D2 of the planetary gear is (1.1:1)-(1.5:1).

More particularly, wherein the ratio of the angle of rotation and the angle of revolution of the planetary gear is (2:1)-(7:1) or (0.1:1)-(0.5:1).

After adopting the above technical scheme, compared with the prior art, the present invention has the following beneficial effects: the planetary gear can spin relative to the crank, and the connecting rod module can also rotate relative to the planetary gear, so as to ensure that the trajectory of the engagement shaft of the connecting rod module is close to a straight line. This makes the eccentric angle close to 0 degree or equal to 0 degree, thus minimizing the friction force under load and avoid wear and other problems, realizing rapid release of the driving mechanism, ensuring the stability and smoothness of the operation of the impact unit 2, and improving the quality of work to allow this invention with a strong market competitiveness and improving the quality of work.

DETAILED DESCRIPTION OF THE INVENTION

Figure 1:
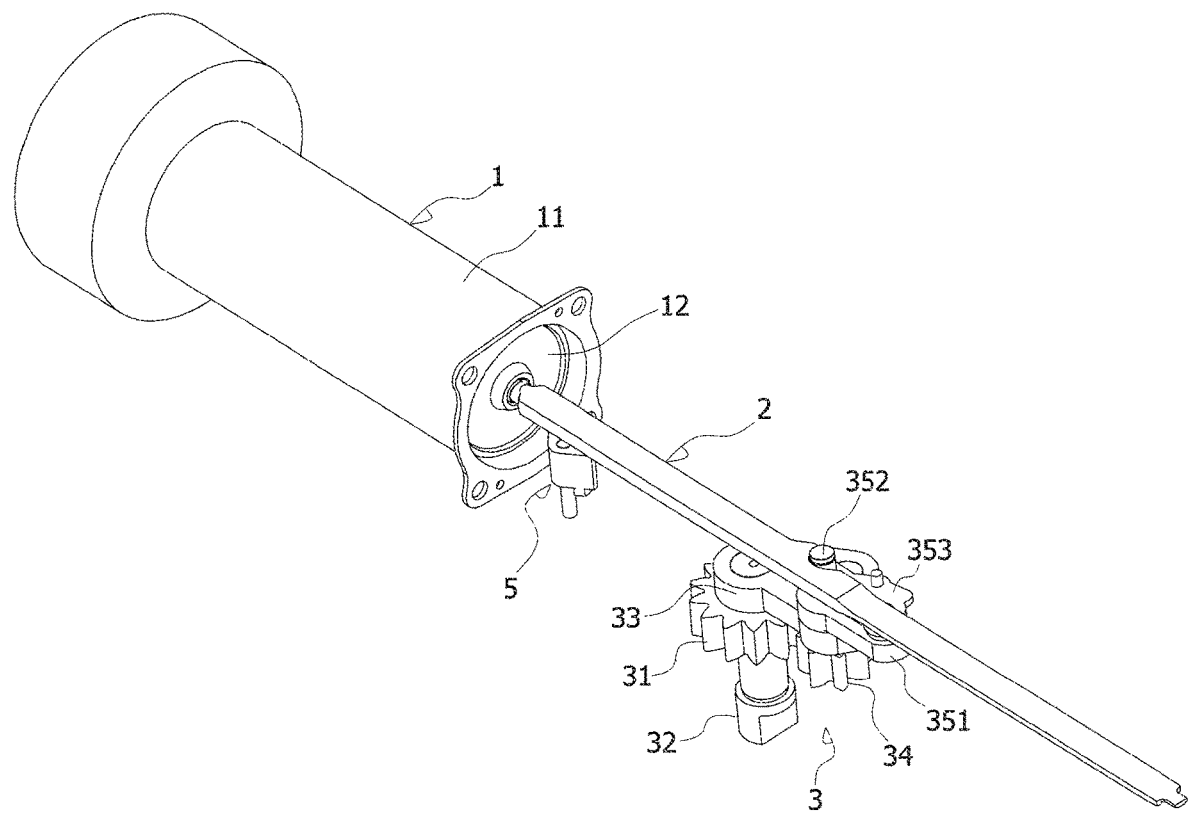
FIG. 1 is a three-dimensional view of the present invention.
Figure 2:
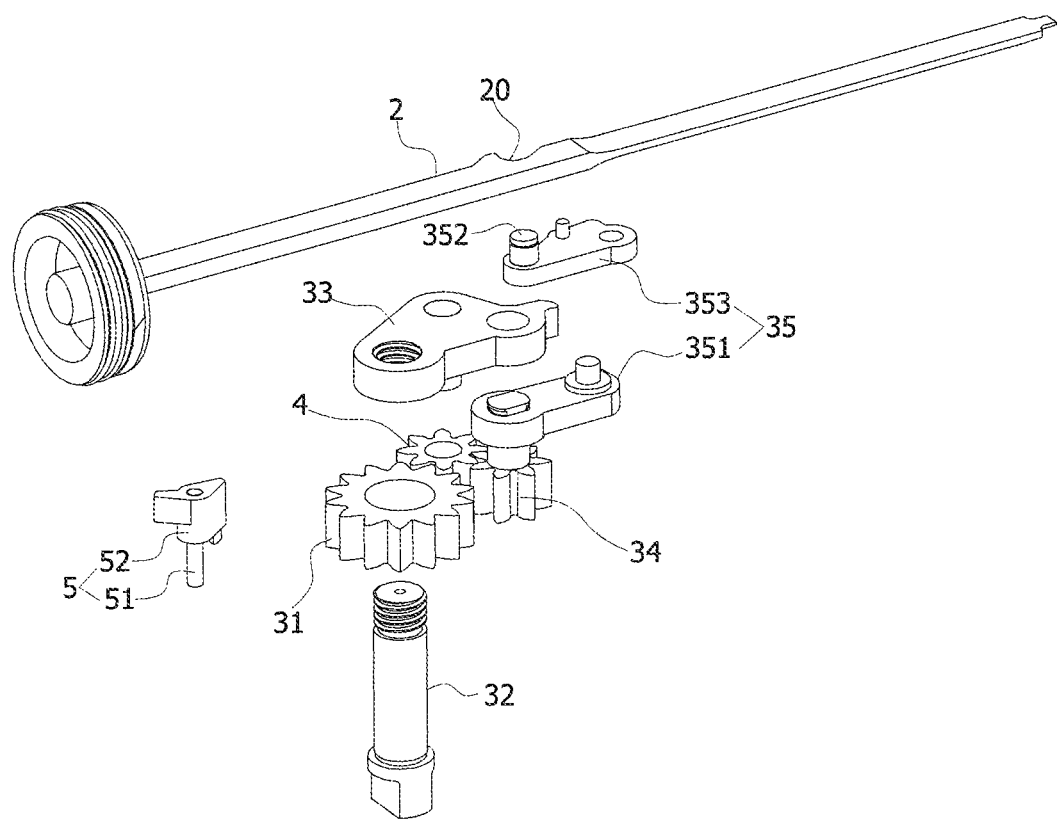
FIG. 2 is a three-dimensional exploded view of the present invention.
Figure 3:
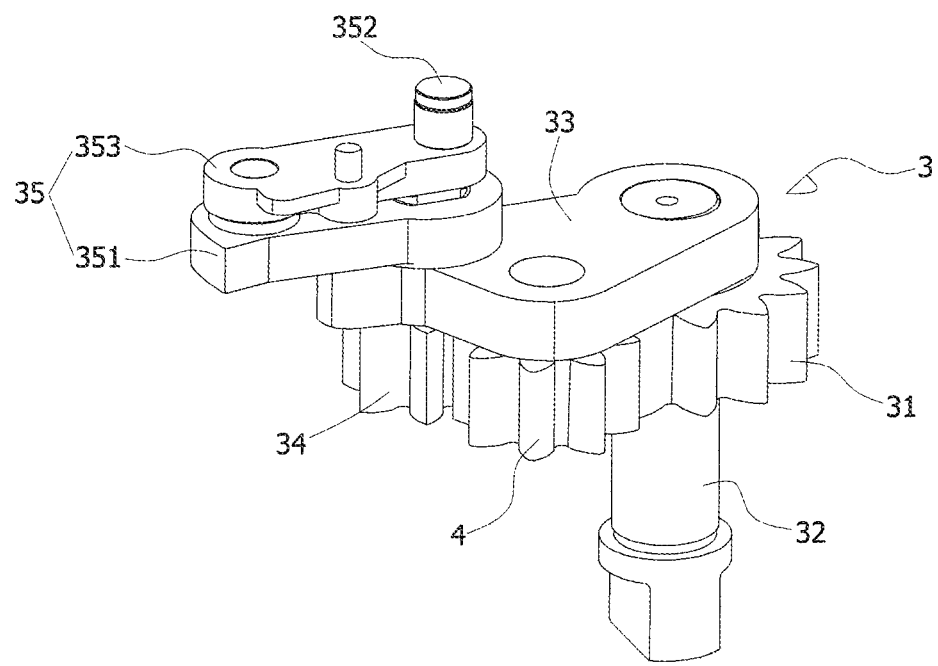
FIG. 3 is a three-dimensional view of the driving mechanism of the present invention.
Figure 4:
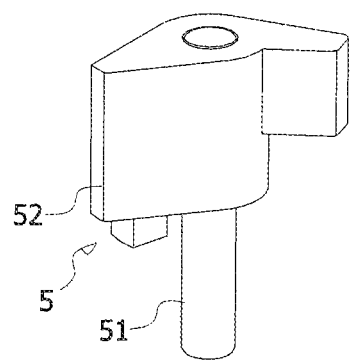
FIG. 4 is a three-dimensional view of the detachment assembly of the present invention.

As shown in FIGS. 1-8, and 10-15, it is a quick fastening device, which comprises an energy storage medium 1, an impact unit 2 connected to the energy storage medium 1, and a driving mechanism 3 for pushing the impact unit 2 to compress the energy storage medium 1 for energy storage.

The impact unit 2 and the driving mechanism 3 are all installed on a base (not shown in the figure).

The energy storage medium 1 is used to be compressed for storing energy and then releasing the energy to do work to the outside and driving the impact unit 2 to achieve impact working.

The energy storage medium comprises any medium that can be compressed to store energy and then expanded to do external work, such as gas, spring, rubber, and various elastomers. In the embodiment, the energy storage medium comprises a cylinder body 11 and air stored in it, and the impact unit 2 is connected to the piston 12 in the cylinder body 11. When the driving mechanism 3 drives the impact unit 2 to move towards the cylinder body 11, the piston moves inward and compresses the gas inside the cylinder body 11 to achieve energy storage purpose. When the impact unit 2 is separated from the driving mechanism 3, the energy stored in the cylinder block 11 is released to drive the impact unit 2 to impact outward quickly.

The driving mechanism 3 is a mechanism that can convert a rotational motion into a linear motion, thereby pushing the impact unit to compress the energy storage medium.

The driving mechanism 3 comprises a fixed sun gear 31, an output shaft 32 not linked to the sun gear 31, a crank 33 fixed on the upper end of the output shaft 32, a planetary gear 34 installed on the crank 33 in a spinning manner and capable of revolving around the sun gear 31 as the crank 33 rotates, and a connecting rod module 35 mounted on the upper end of the planetary gear 34 and connected to the impact unit 2. A linkage element is arranged between the planetary gear 34 and the sun gear 31 for driving the planetary gear 34 to rotate in a direction opposite to the direction in which the planetary gear 34 revolves relative to the sun gear 31. The lower end of the output shaft 32 is usually connected with a reduction gearbox or a motor to transmit output work, such that the output shaft 32 can rotate. The output shaft 32 passes through the center hole of the sun gear 31 to which it is not linked. The lower end of the sun gear 31 is fixedly mounted on a base (not shown in the figure), so that the sun gear 31 cannot rotate. When the driving mechanism 3 is in operation, the output shaft 32 rotates to drive the crank 33 to rotate. At this time, the planetary gear 34 can revolve around the sun gear under the drive of the crank 33. At the same time, the planetary gear 34 can spin relative to the crank 33, and the connecting rod module 35 can also rotate relative to the planetary gear 34, so as to ensure that the trajectory of the engagement shaft 352 of the connecting rod module 35 is close to a straight line. This makes the eccentric angle close to 0 degree or equal to 0 degree, thus minimizing the friction force under load and avoid wear and other problems, realizing rapid release of the driving mechanism, ensuring the stability and smoothness of the operation of the impact unit 2, and improving the quality of work to allow this invention with a strong market competitiveness.

Figure 16:
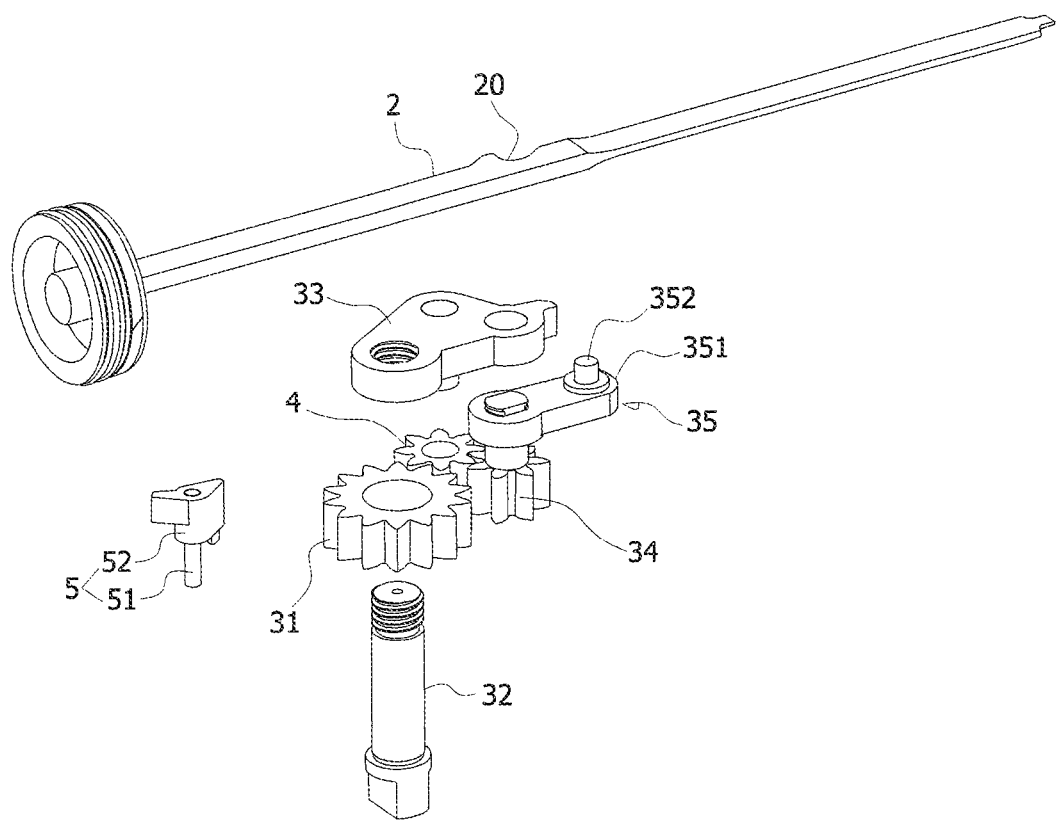
FIG. 16 is a three-dimensional exploded view of the second structure of the present invention.
Figure 17:
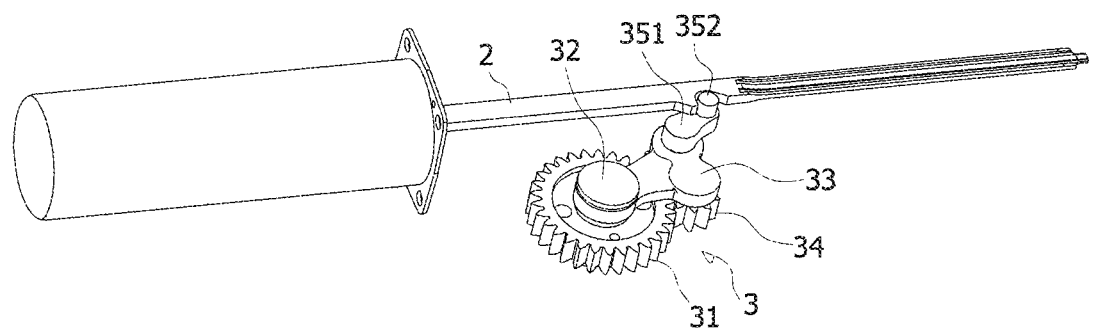
FIG. 17 is a three-dimensional view of the third structure of the present invention.
Figure 18:
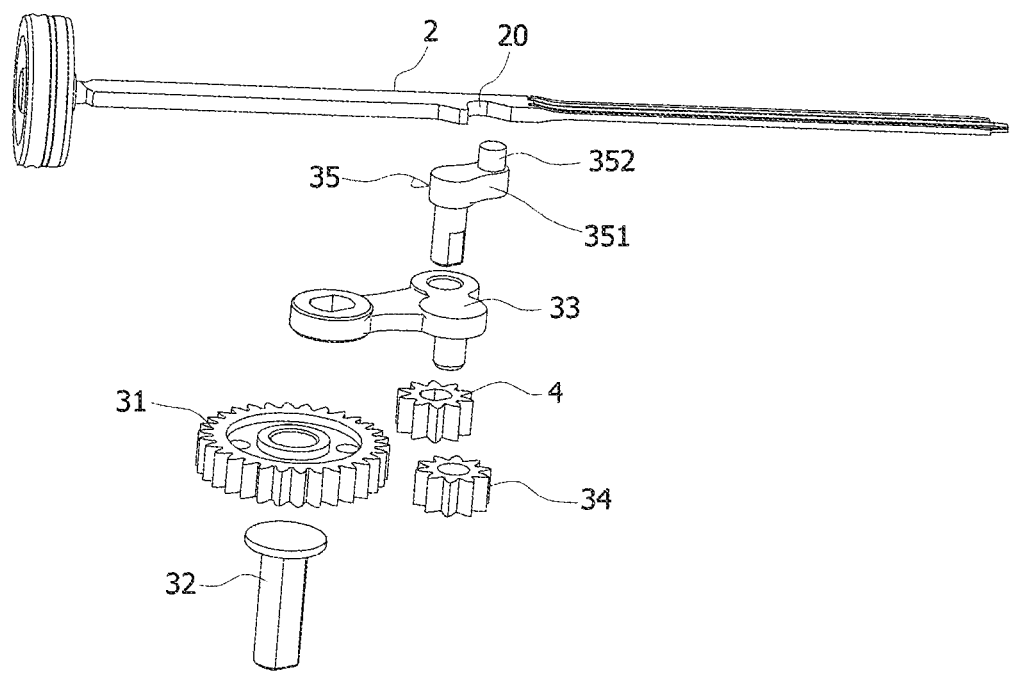
FIG. 18 is a three-dimensional exploded view of the third structure of the present invention.
Figure 19:
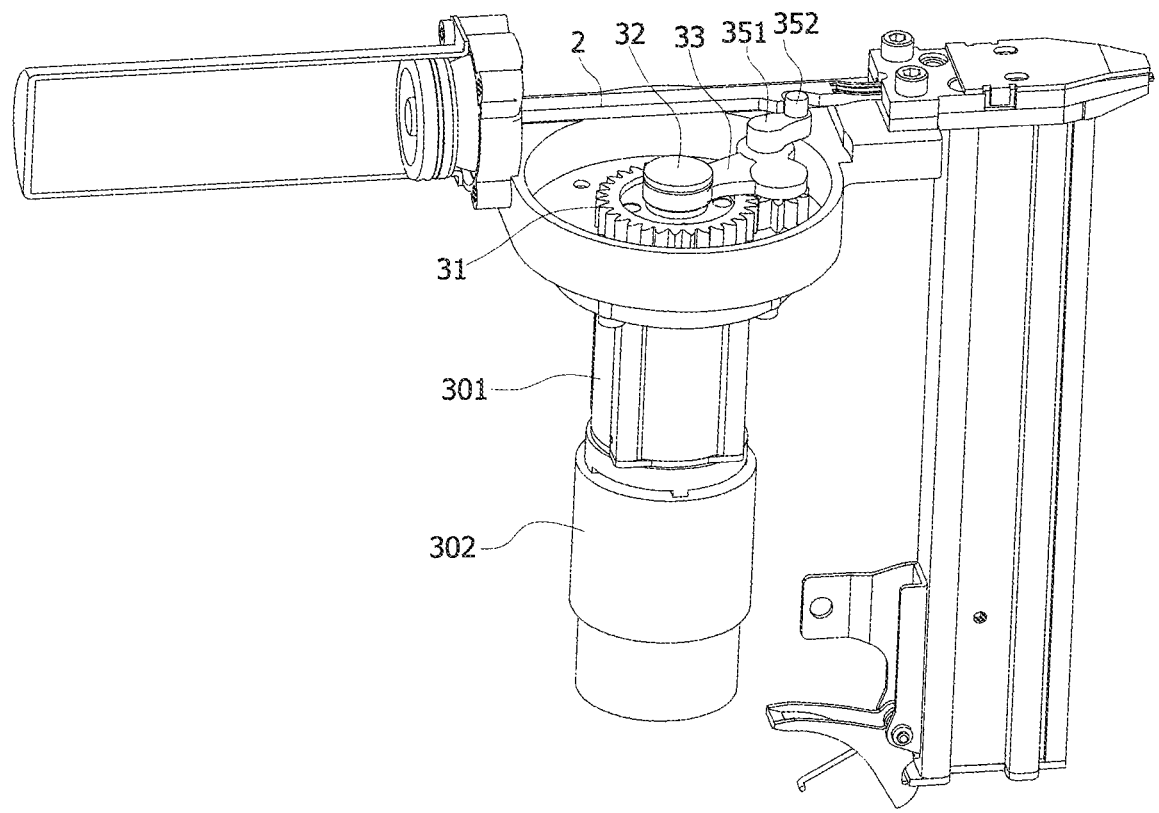
FIG. 19 is a overall assembly drawing of the third structure of the present invention.

The connecting rod module 35 can be one of the following two structures. For the first type, with reference to FIG. 16, the connecting rod module 35 comprises a connecting rod 351 mounted on the upper end of the planetary gear 34. The connecting rod 351 is provided with an engagement shaft 352 connecting to the impact unit 2. For the second type, with reference to FIGS. 1 and 2, the connecting rod module 35 comprises a connecting rod 351 fixed to the upper end of the planetary gear 34 and linked with the planetary gear 34, and a swing rod 353 mounted on the upper end of the connecting rod 351 and rotatable relative to the connecting rod 351. The swing rod 353 is provided with an engagement shaft 352. The connecting rod 351 can be regarded as an extension of the planetary gear in the radial direction, and the swing rod 353 is installed on the upper end of the connecting rod 351 in a rotatable way, such that the swing rod 353 can rotate on its own axis. As a preferred embodiment, the connecting rod module 35 adopts the second structure.

The rotation angle of the planetary gear is the same as the revolution angle. The ratio of the reference diameter D1 of the sun gear 31 to the reference diameter D2 of the planetary gear is 2:1. This makes the crank rotate from the bottom dead center to the top dead center by 180°, the planetary gear also rotates by 180°; when the crank rotates 360°, the planetary gear also rotates 360°, returning the driving mechanism to the original point. Let the center of the engagement shaft on the connecting rod connecting to the impact unit or the swing rod be point O, the distance from point O to the rotation center of the planetary gear be A, and the center distance between the sun gear and the planetary gear be D.

Figure 5:
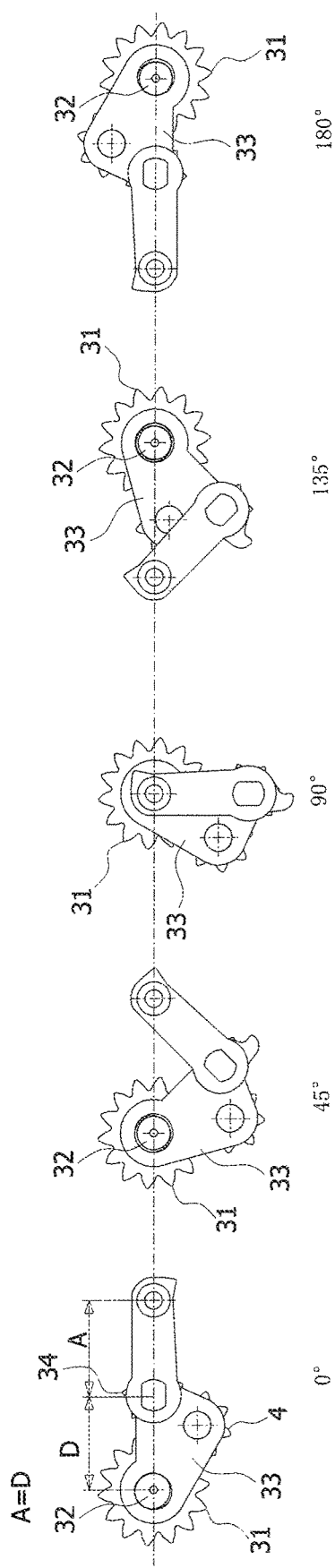
FIG. 5 is the operation state diagram 1 of the driving mechanism of the present invention.

With reference to FIG. 5, when A=D, the trajectory of point O is a straight line, and the swing angle of the connecting rod is 0°.

Figure 6:
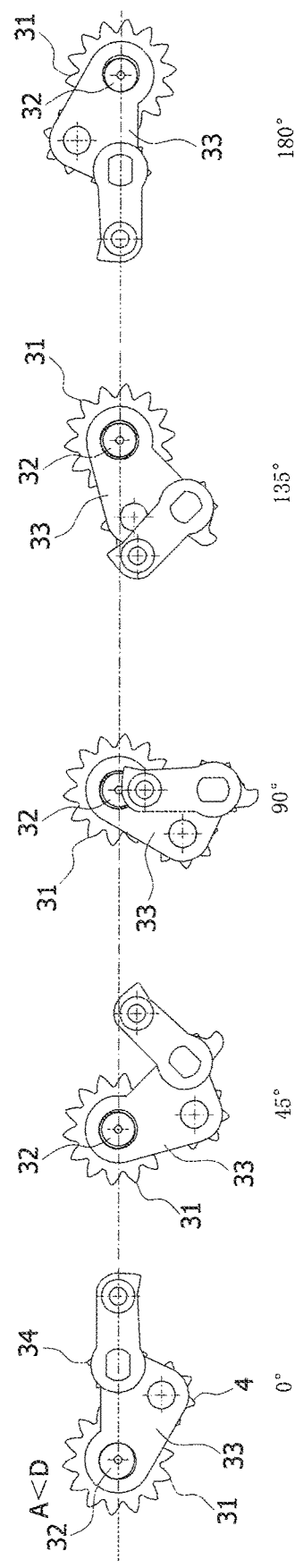
FIG. 6 is the operation state diagram 2 of the driving mechanism of the present invention.
Figure 7:
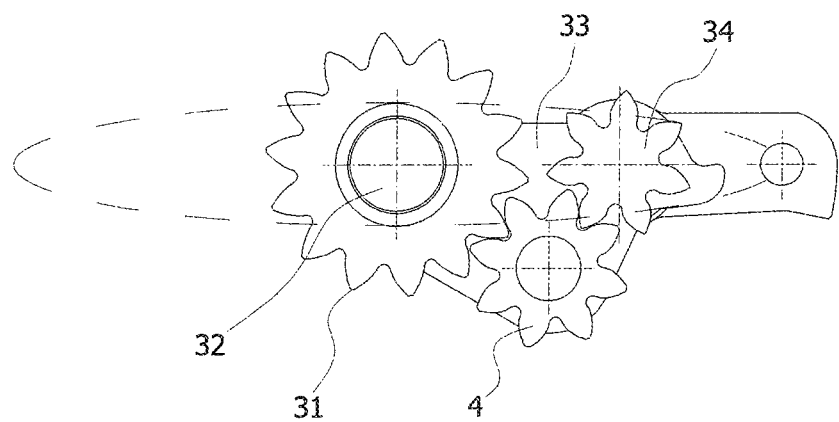
FIG. 7 is the operation state diagram 3 of the driving mechanism of the present invention.
Figure 8:
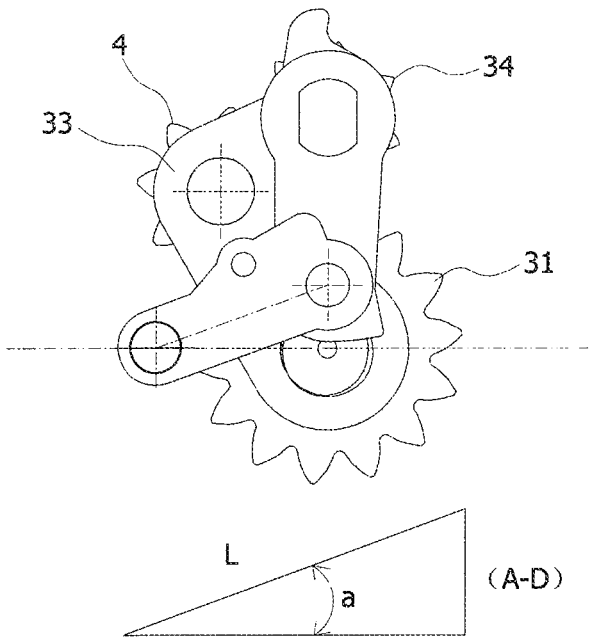
FIG. 8 is a schematic diagram showing the maximum swing angle of the swing rod in the present invention.
Figure 9:
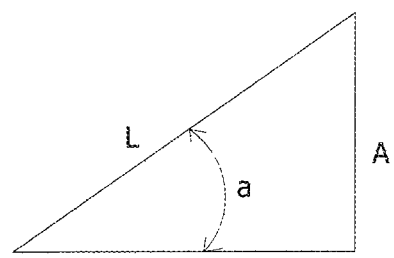
FIG. 9 is a schematic diagram showing the maximum swing angle of the connecting rod in the traditional crank-connecting rod structure in the present invention.

With reference to FIGS. 6 and 7, when A>D or A<D, the trajectory of point O is an ellipse, and the semi-major axis of the ellipse is D+A, and the semi-minor axis is |D−A|. As shown in FIG. 8, let the length of the connecting rod be L, its maximum swing angle a is a=arcsin((D−A)/L). As shown in FIG. 9, the maximum swing angle of the connecting rod in the traditional crank-connecting rod structure is a=arcsin (A/L).

It can be seen from the formula that the swing angle a of the connecting rod of the sun gear-planetary gear structure of this invention can be greatly reduced, that is, reducing the swing angle.

The linkage element is an idler gear 4. The main function of the idler gear is to make the rotation direction of the planetary gear opposite to the rotation direction of the crank (the revolution direction of the planetary gear). The idler gear 4 can be installed on the crank 33 in a self-rotating manner, and is located between the sun gear 31 and the planetary gear 34. The idler gear 4 meshes with the sun gear 31 and the planetary gear 34.

Figure 10:
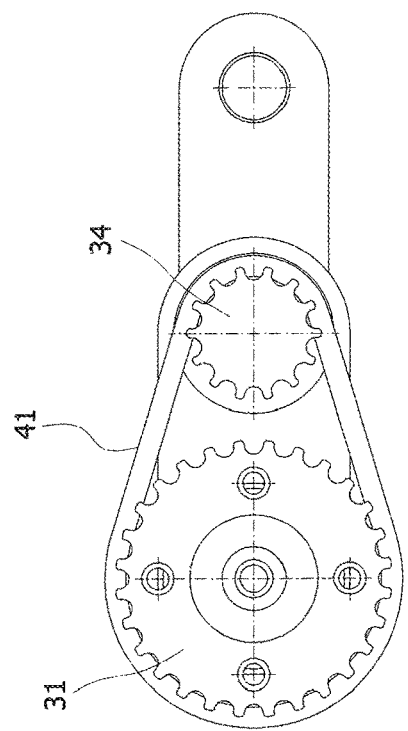
FIG. 10 is a schematic diagram showing the structure of the driving mechanism in another structure of the present invention.
Figure 11:
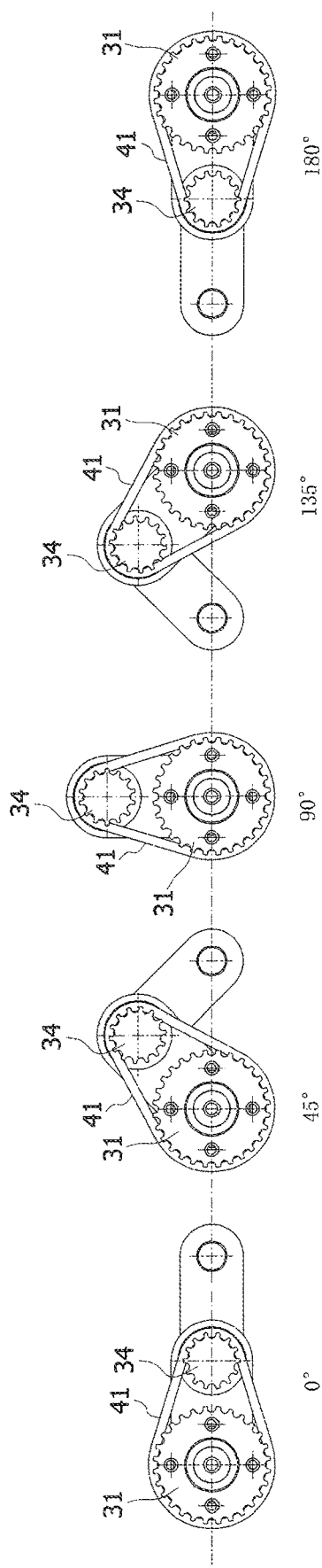
FIG. 11 is a schematic diagram showing the operation of the driving mechanism in another structure of the present invention.

The linkage element can also be a belt 41 or a chain (not shown), and the belt or the chain surrounds the sun gear 31 and the planetary gear 34. Either the belt or the chain can make the rotation of planetary gear 34 opposite to the rotation direction of the crank 33 (the revolution direction of the planetary gear 34). Take the belt 41 as an example, the basic structure is shown in FIG. 10, and the movement pattern is shown in FIG. 11.

The invention also comprises a disengagement assembly 5 for driving the impact unit 2 to disengage with the engagement shaft 352. Specifically, the disengagement assembly 5 comprises a first rotation shaft 51 and a disengagement block 52 mounted on the upper end of the first rotation shaft 51; or, the disengagement assembly 5 comprises a first rotation shaft 51 and a disengagement block 52 integrally fixed to the upper end of the first rotation shaft 51.

The impact unit 2 is an impact rod, and the side of the impact rod is provided with a groove 20. The engagement shaft 352 is placed in the groove 20 to form a connection; or the side of the impact rod is provided with a bulge, and the engagement shaft 352 abuts against the bulge to form a connection.

Figure 12:
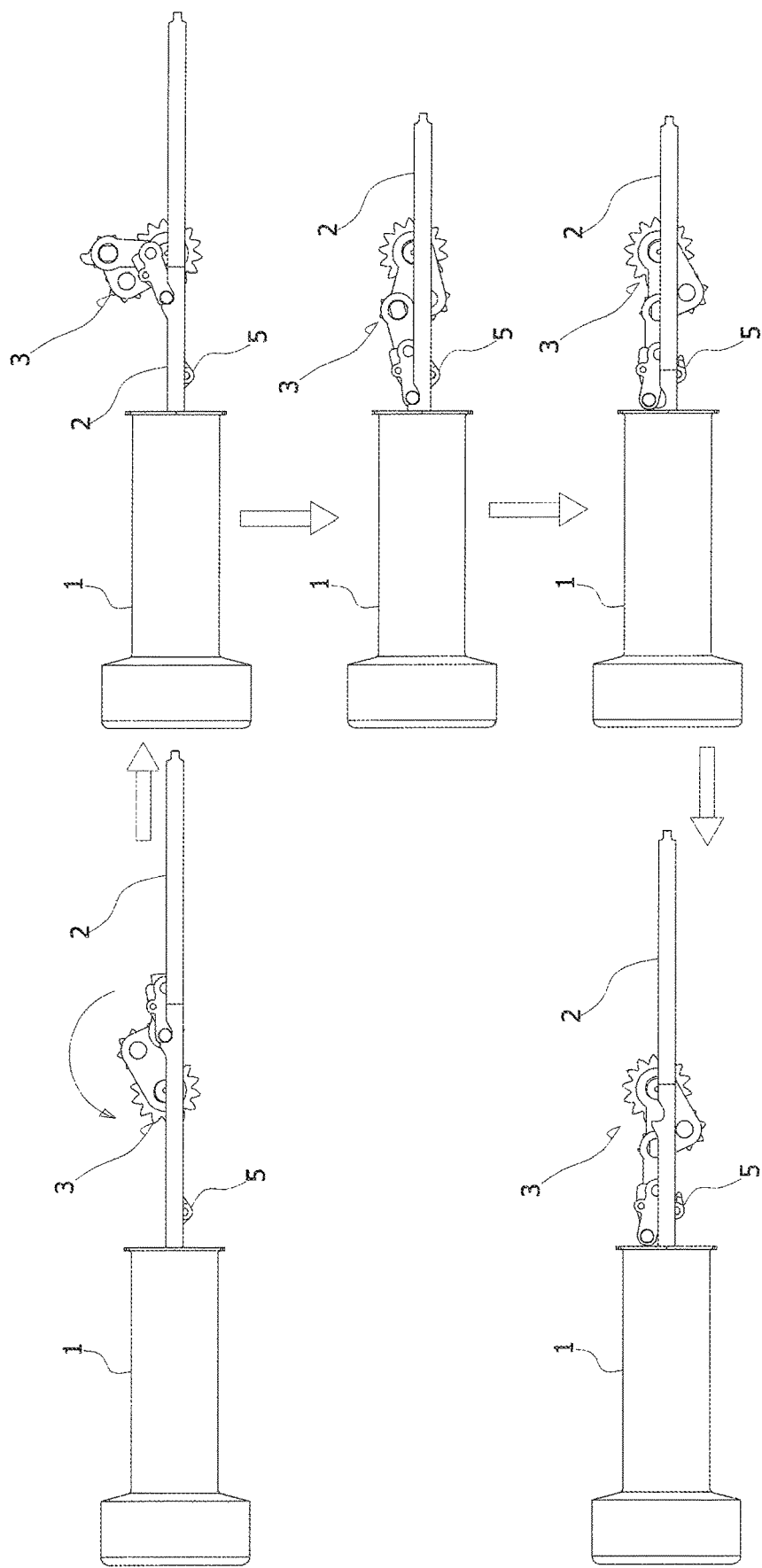
FIG. 12 is a diagram showing the working state of the present invention.

The working principle of the present invention is shown in FIG. 12. Suppose the output shaft 32 rotates counterclockwise. When the output shaft rotates to state 1, near the bottom dead center of the crank, the connecting rod and the impact unit 2 are mechanically engaged. When the output shaft continues to rotate form state 1 to state 4 in that order, the connecting rod pushes the impact unit 2 to compress the energy storage medium 1 to achieve energy storage. When the crank 33 reaches the vicinity of the top dead center (state 4), the driving mechanism pushes the disengagement element, such that the disengagement element pushes the connecting rod to allow the connecting rod to be separated from the impact unit. It should be noted that, according to the principle in FIG. 5, when A is equal to D or the difference between the two is less, the engagement shaft can be directly installed at point O to push the impact unit, while the swing rod is not necessarily required. In state 5, when the connecting rod is separated from the impact unit, the impact unit does work by the thrust of the energy storage medium. When the output shaft continues to rotate to state 1, it completes a cycle. The starting point of this cycle is not limited to state 1.

Figure 13:
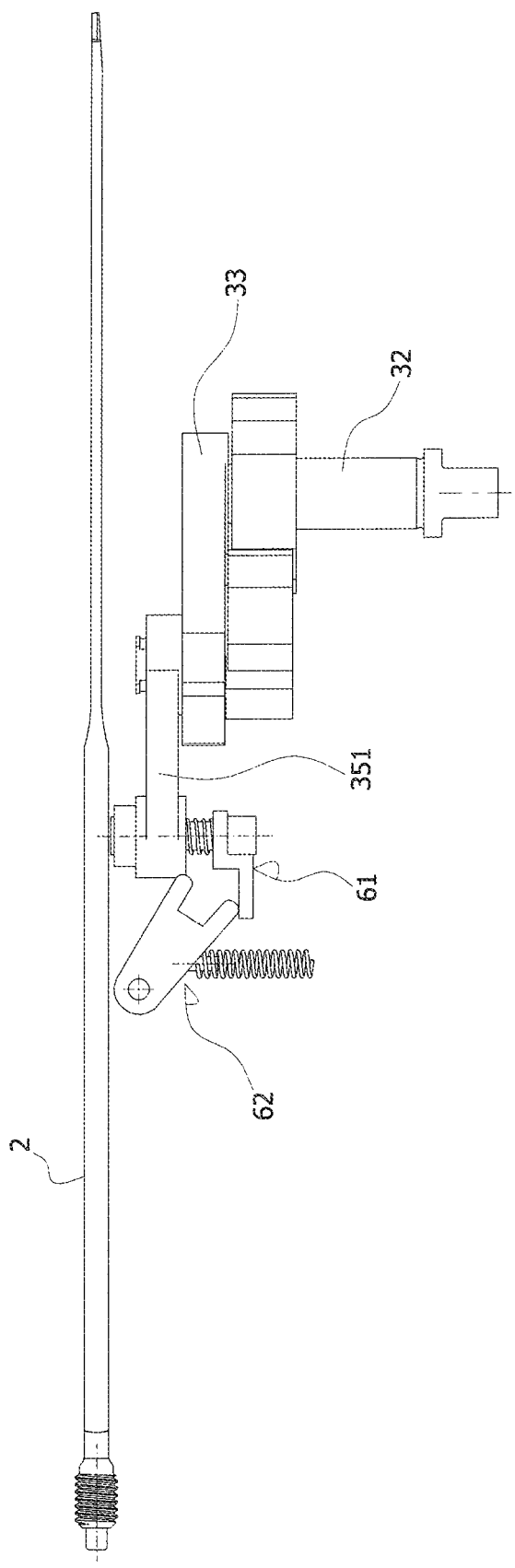
FIG. 13 is a front view in another structure of the present invention.
Figure 14:
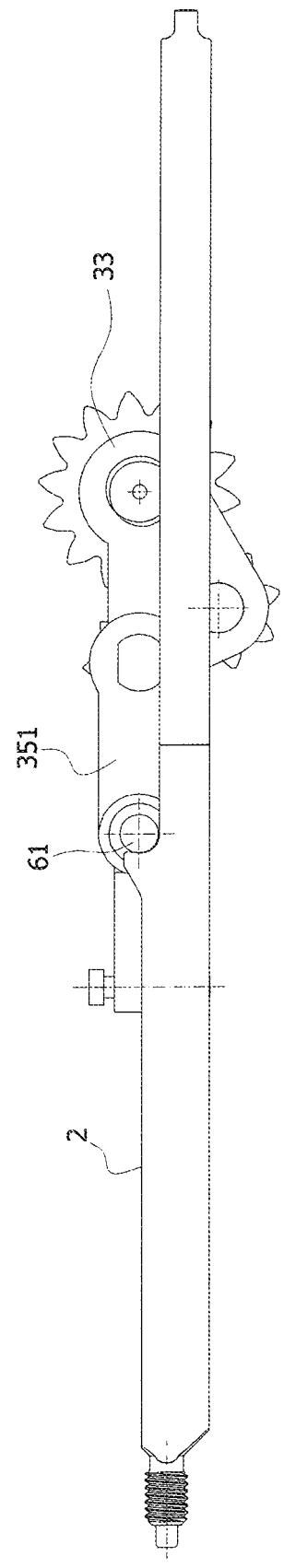
FIG. 14 is a top view in another structure of the present invention.

With reference to FIGS. 13 and 14, in this embodiment, the lever assembly 62 is rotated to push the connecting rod 351 to separate the connecting rod 351 from the impact unit 2 by using the lever principle. However, the disengagement structure is not limited to the lever element, and can also be an inclined block by sliding disengagement. When the engagement shaft 61 is directly installed at point O to push the impact unit, the engagement shaft 61 can be separated from the impact unit by means of axial disengagement, according to FIGS. 13 and 14. When the crank reaches near the top dead center, the connecting rod 351 pushes the lever element 62 to make the engagement shaft 61 move in the axial direction to separate from the impact unit 2.

Figure 15:
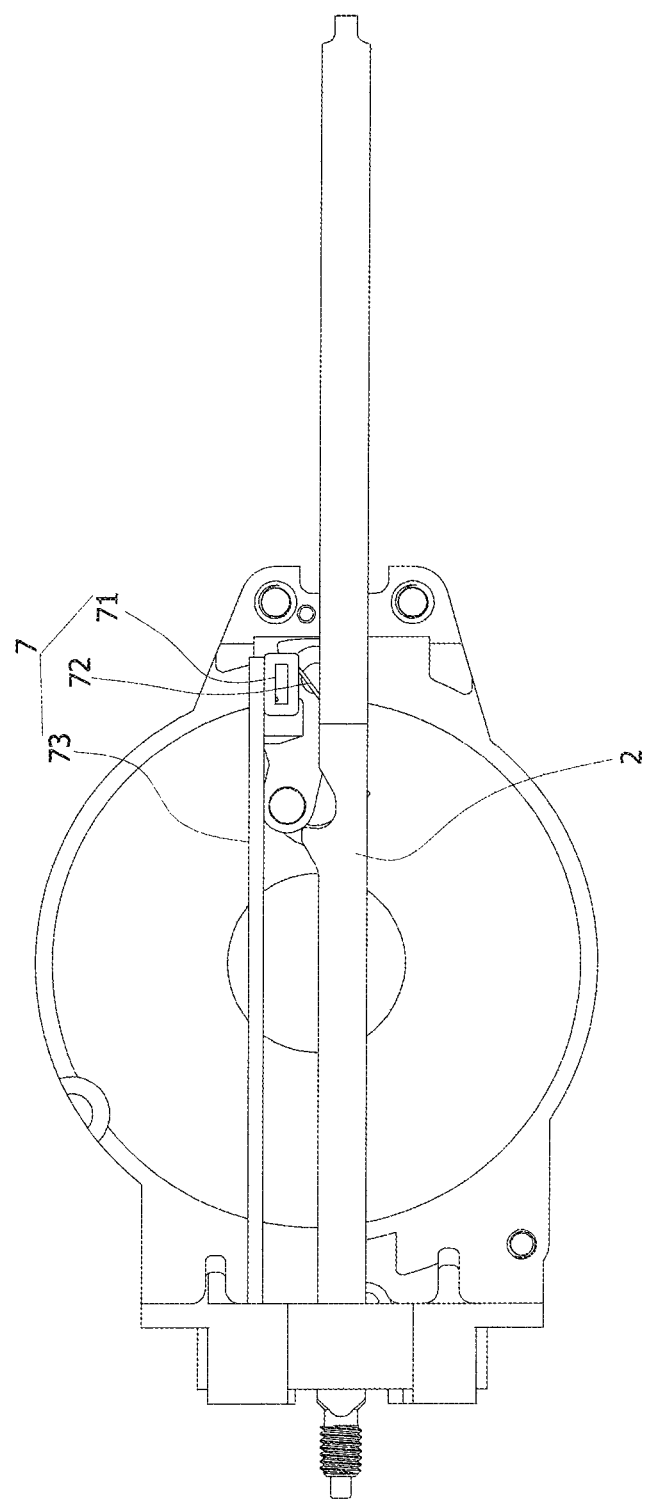
FIG. 15 is an assembly drawing of the reset unit and the impact unit in the present invention.

As shown in FIG. 15, the present invention also comprises a reset unit 7 for resetting the swing rod 353. The reset unit 7 comprises a sliding block 71 and a torsion spring 72 installed between the swing rod 353 and the sliding block 71. The sliding block 71 can slide on the guide rail 73 under the drive of the swing rod 353. When the connecting rod 351 is at the engaging position, the reset unit 7 provides a force to rotate the non-hinge end of the swing rod 353 toward the engaging position. The reset unit can be elastic rubber, spring, magnetic force, etc., and is not limited to the sliding block-torsion spring structure shown in FIG. 15.

In conclusion, the present invention uses the sun gear-planetary gear structure to convert the rotary motion into the reciprocating motion. When the output shaft 32 rotates, the crank 33 is driven to rotate. At this time, the planetary gear 34 can be driven by the crank 33 to fulfill revolution around the sun gear. At the same time, the planetary gear 34 can rotate on its own axis relative to the crank 33. The connecting rod module 35 can also rotate relative to the planetary gear 34 to ensure that the trajectory of the engagement shaft 352 of the connecting rod module 35 is close to a straight line. This makes the eccentric angle close to 0 degree or equal to 0 degree, thus minimizing the friction force of motion under load and avoid wear and other problems, realizing rapid release of the driving mechanism, ensuring the stability and smoothness of the operation of the impact unit 2, and improving the quality of work to allow this invention with a market competitiveness.

The above descriptions are all based on the ratio of the reference diameter D1 of the sun gear 31 to the reference diameter D2 of the planetary gear is 2:1.

Based on the above embodiment, the ratio of the reference diameter of the sun gear 31 to that of the planetary gear can be extended to (3:1)-(8:1), that is, 3:1, 4:1, 5:1, 6:1, 7:1 or 8:1, or the ratio of the reference diameter of the sun gear 31 to the reference diameter D2 of the planetary gear 34 can be (1.1:1)-(1.5:1), that is, can be a non-integer ratio n:(n−1) of 3:2 or 4:3. This kind of ratios can also give an approximate polygonal trajectory, but the number of revolutions is merely more than one.

With reference to FIGS. 17-21, the driving mechanism 3 comprises a fixed sun gear 31, an output shaft 32 not linked to the sun gear 31, a crank 33 fixed on the upper end of the output shaft 32, a planetary gear 34 installed on the crank 33 in a spinning manner and capable of revolving around the sun gear 31 as the crank 33 rotates, and a connecting rod module 35 mounted on the upper end of the planetary gear 34 and connected to the impact unit 2 with a spinning function. A linkage element is arranged between the planetary gear 34 and the sun gear 31 for driving the planetary gear 34 to rotate in a direction opposite to the direction in which the planetary gear 34 revolves relative to the sun gear 31. The lower end of the output shaft 32 is usually connected to a reduction gearbox 301 or a motor 302 to transmit output work, such that the output shaft 32 can rotate.

The connecting rod module 35 comprises a connecting rod 351 mounted on the upper end of the planetary gear 34. The connecting rod 351 is provided with an engagement shaft 352 connecting to the impact unit 2.

Figure 20:
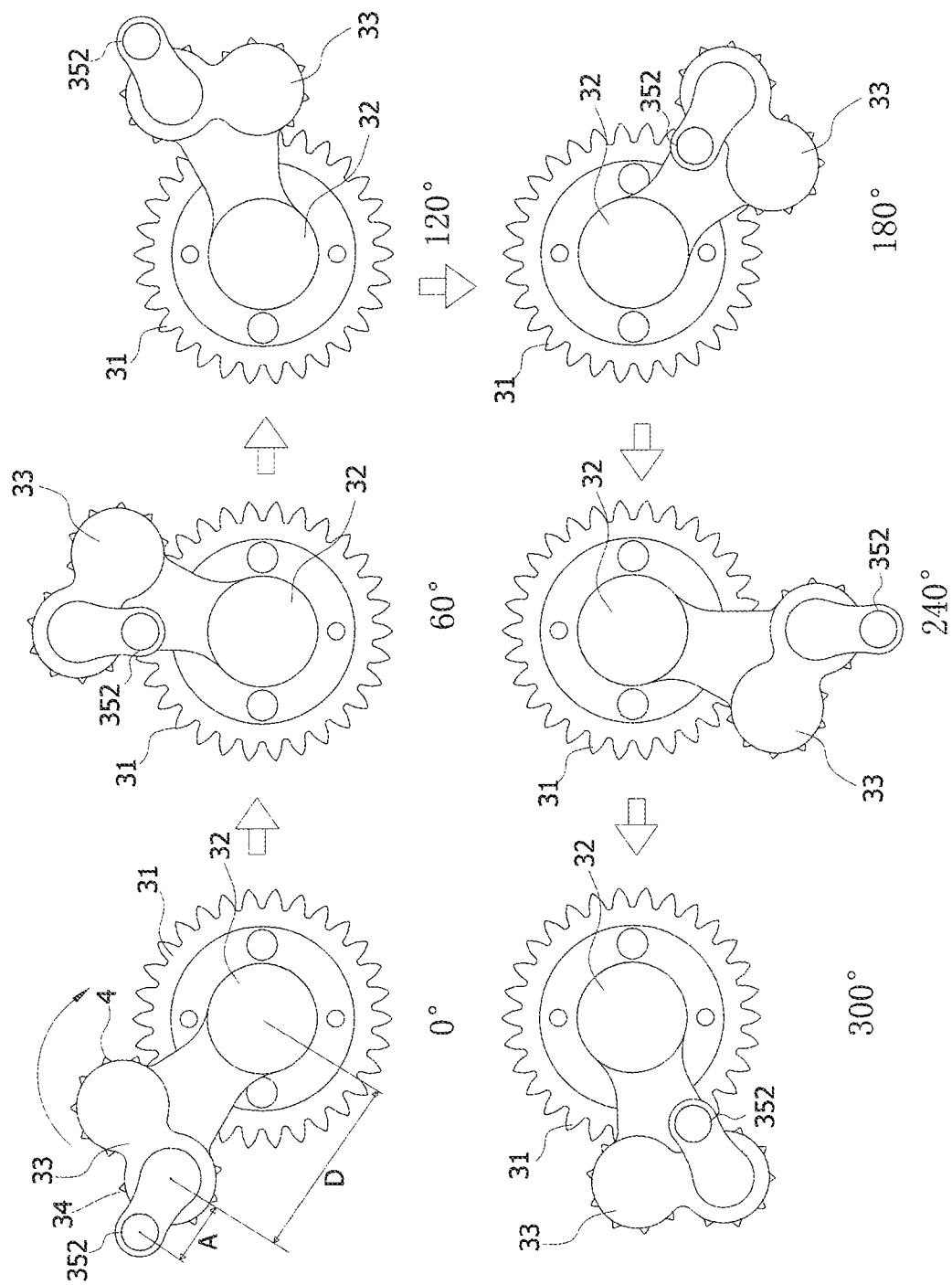
FIG. 20 is a working principle diagram of the third structure of the present invention (front side)
Figure 21:
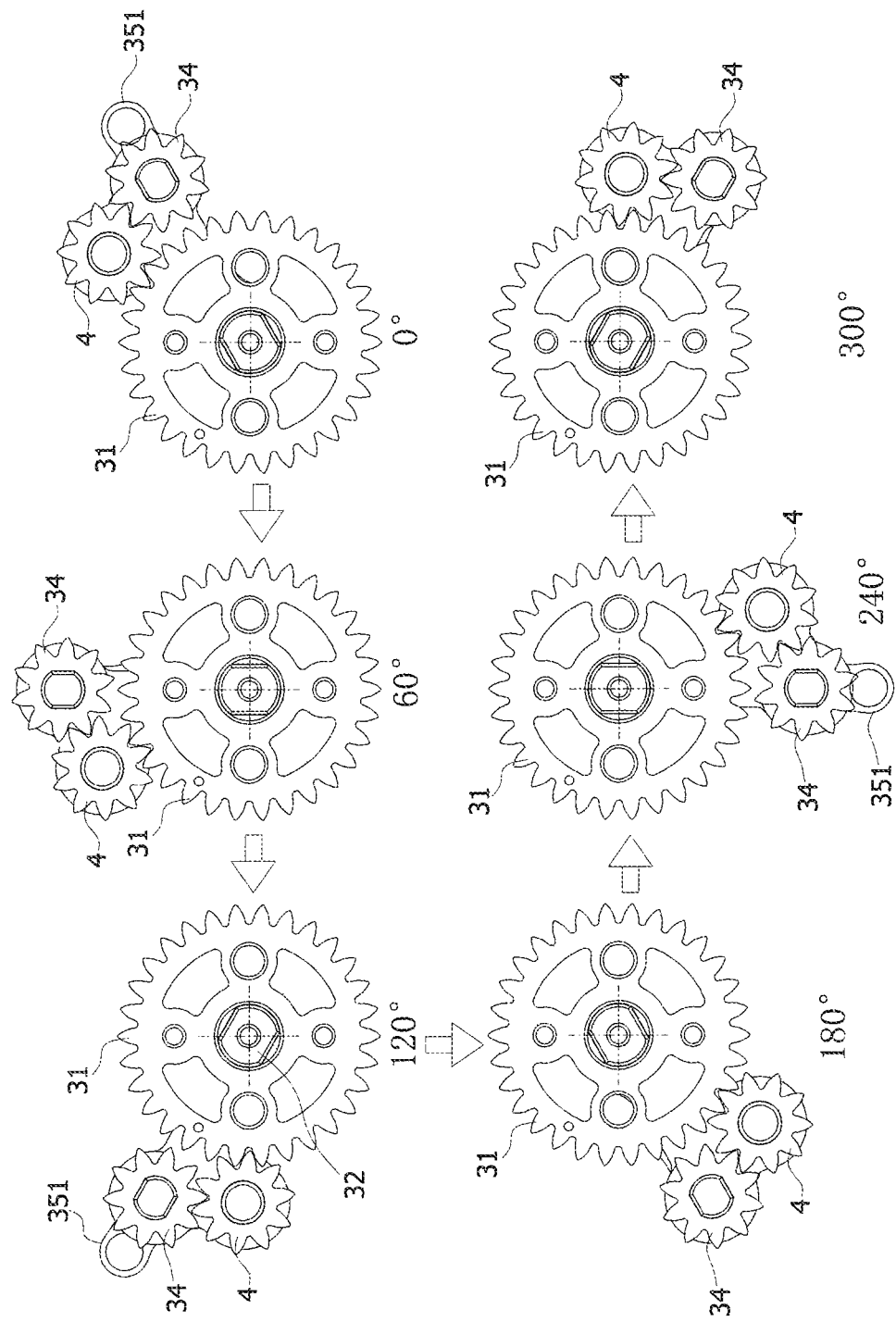
FIG. 21 is a working principle diagram of the third structure of the present invention (reverse side)
Figure 22:
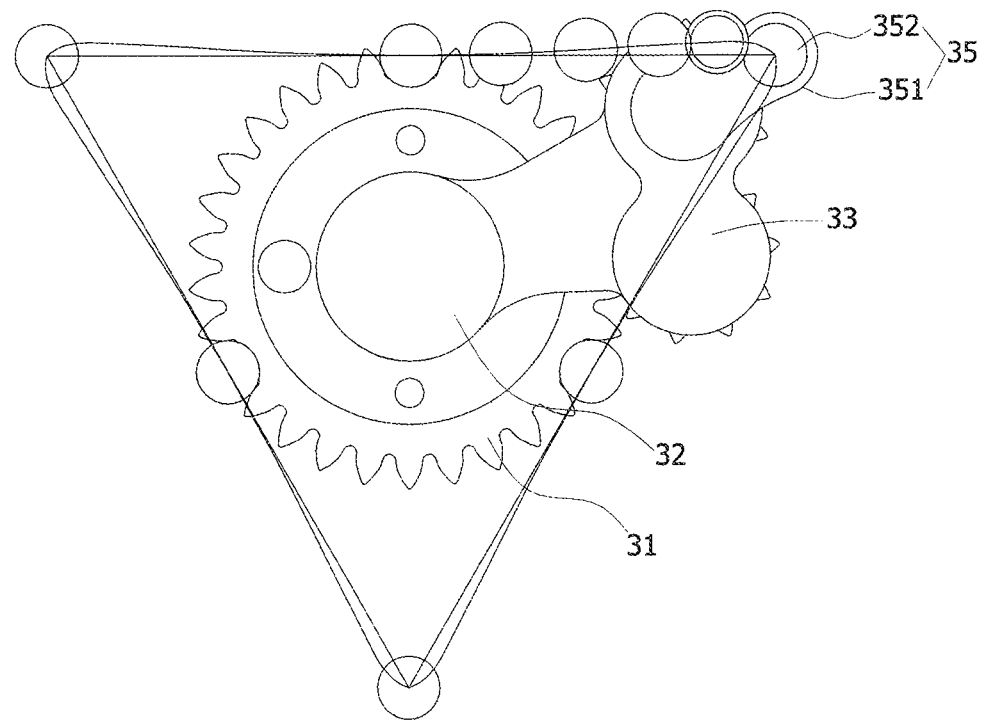
FIG. 22 is a motion trajectory diagram of the third structure of the present invention (gear ratio 3:1)

Let the center of the engagement shaft 352 be point O, the distance from point O to the rotation center of the planetary gear 34 be A, and the center distance between the sun gear 41 and the planetary gear 34 be D. As shown in FIGS. 20-22, when the ratio of the reference diameter of the sun gear 31 to the reference diameter of planetary gear is extended to 3:1, the crank 33 drives the planetary gear 34 and the connecting rod 351 connected thereto to rotate, and the motion trajectory of the point O is an approximate triangle. The approximate triangle is an equilateral triangle with a side length of $2*(D+A)*\sin60°$. In the practical application of the embodiment, a part or the entire side of one side of the approximate triangle can be used to accomplish the compression of the energy storage medium. It should be noted that the degree of approximation between the trajectory of point O and the triangle is related to the ratio between D and A. According to FIG. 22, when the crank 33 is located at 0°, 120°, and 240°, the center O of the engagement shaft 352 is located at the three vertices of the triangle. If now the crank is located at 60°, 180°, 300°, the position of point O is at the midpoint of each corresponding side of the triangle, and a motion trajectory with satisfactory approximation can be obtained, where D=3A. In FIG. 22, the triangle-like dashed line shows the motion trajectory of point O, and the circle shows the position of some nodes passed by the engagement shaft. The triangle-like solid line shows the approximated polygon.

Figure 23:
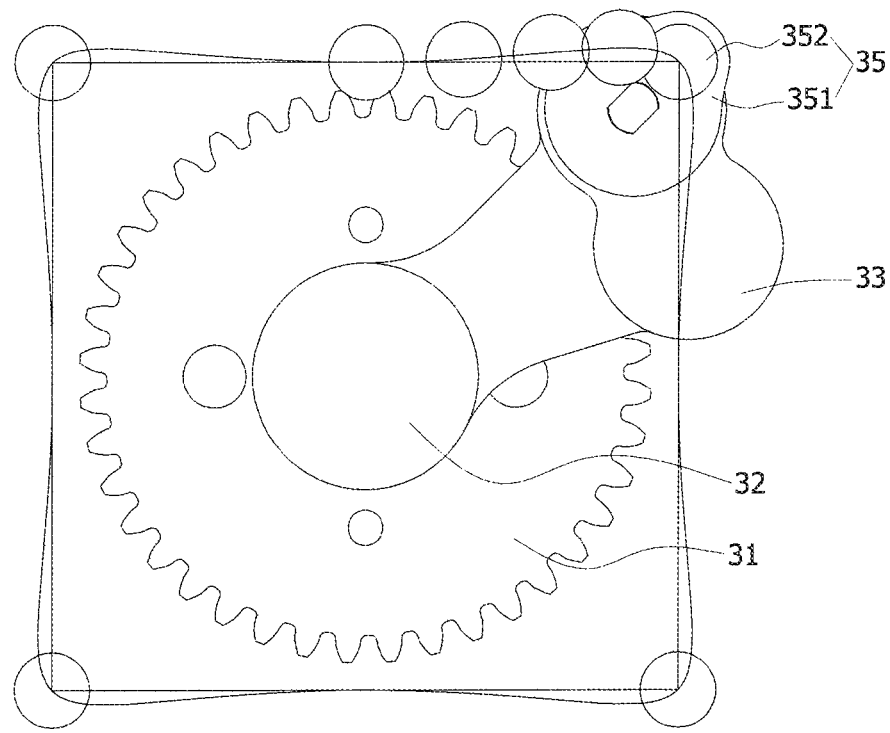
FIG. 23 is a motion trajectory diagram of the third structure of the present invention (gear ratio 4:1)

Similarly, as shown in FIG. 23, when the ratio of the reference diameter of the sun gear 31 to the reference diameter of planetary gear is extended to 4:1, the motion trajectory of the O point is an approximate quadrilateral, and the approximate quadrilateral is a square with a side length of $2*(D+A)*\sin45°$. Similarly, the vertices and midpoints of each side of the quadrilateral can be used as the control points of the motion trajectory of point O, so as to obtain a motion trajectory with a higher approximation to the quadrilateral, where D=5.826A. Generally, when the gear ratio (that is, the ratio of the reference diameter of the sun gear 31 to the reference diameter of planetary gear) is n:1, D:A can be set as $D:A=(1+\cos(180°/n)):(1-\cos(180°/n))$, so as to obtain a motion trajectory with a higher approximation to the n-sided polygon with a side length of $2*(2/(1-\cos(180°/n)))*A*\sin(180°/n)$. It should be noted that the above equations about D:A do not need to be exactly equal, but can be approximately equal, except that the degree of approximation of the motion trajectory of point O with the polygon may change.

When the gear ratio is less than 2:1, that is, the ratio of the reference diameter D1 of the sun gear 31 to the reference diameter D2 of planetary gear 34 is (1.1:1)-(1.5:1), such as 3:2, 4:3, or 5:4; the patterns are as follows.

Figure 41:
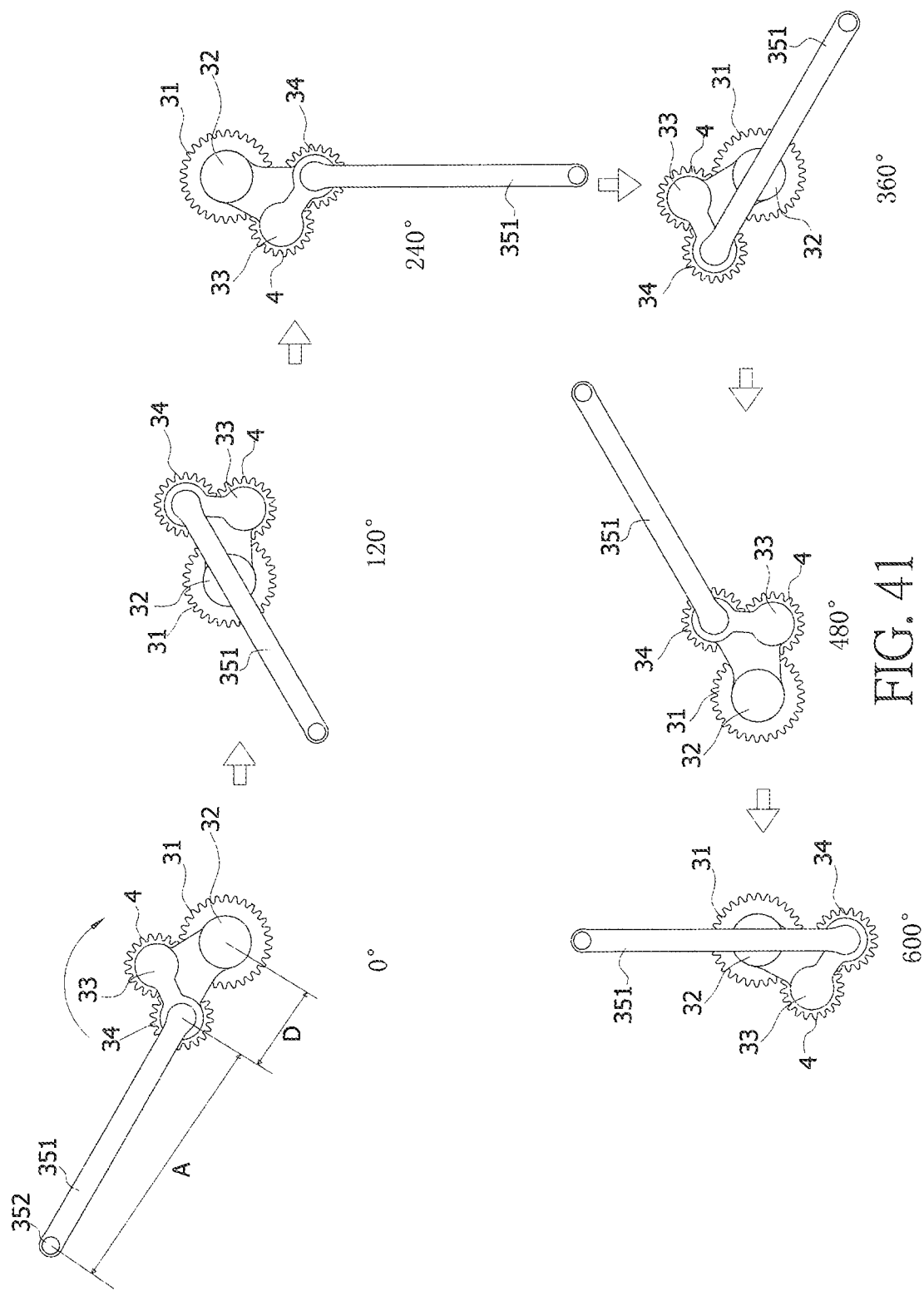
FIG. 41 is the working principle diagram of the eighth structure of the present invention (front side)
Figure 42:
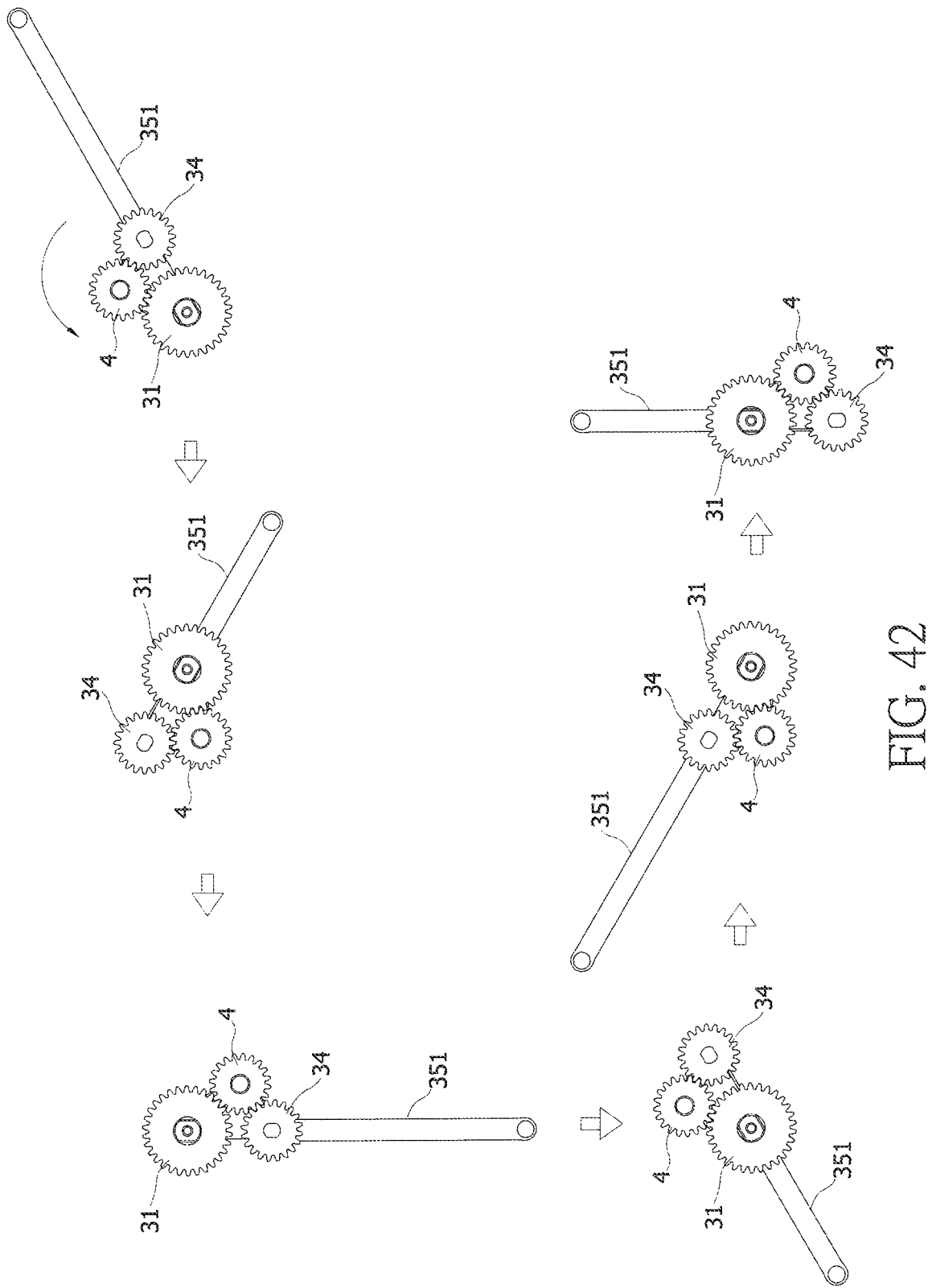
FIG. 42 is the working principle diagram of the eighth structure of the present invention (reverse side)
Figure 43:
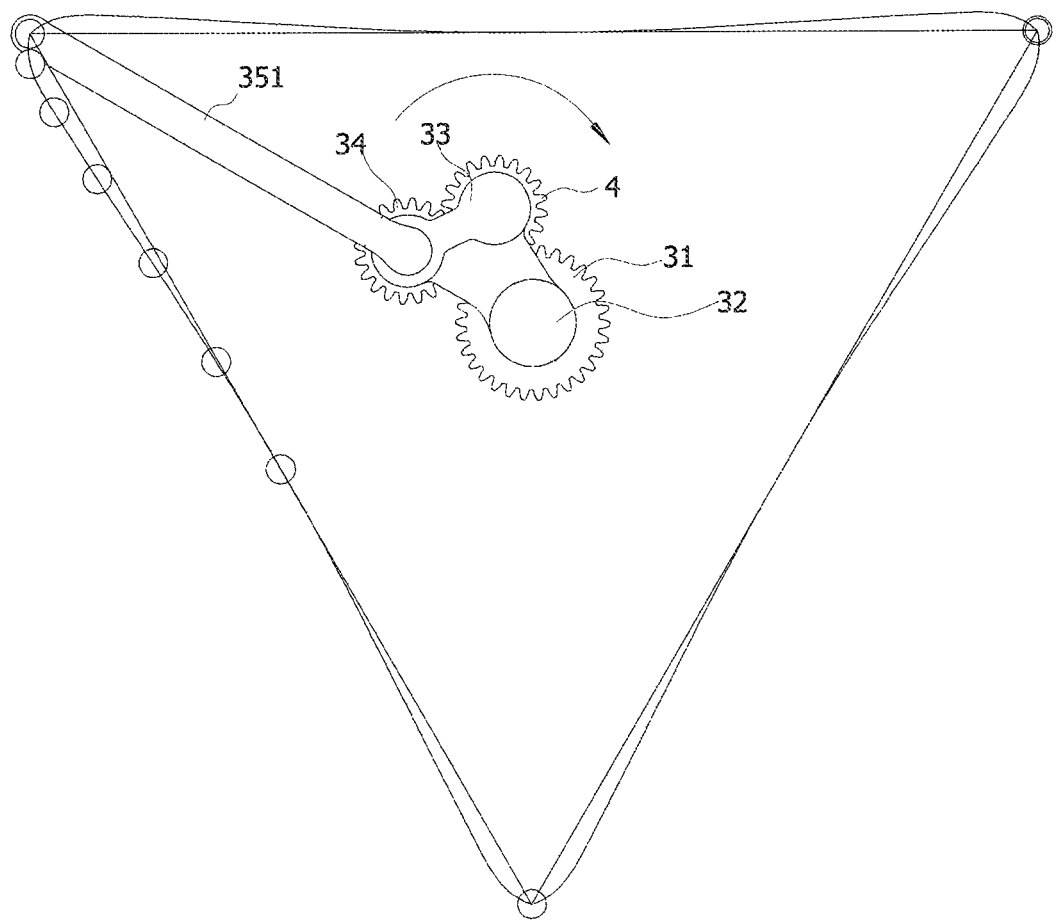
FIG. 43 is the motion trajectory diagram of the eighth structure of the present invention (gear ratio 3:2).

As shown in FIGS. 41-43, when the gear ratio is 3:2, the crank 33 drives the planetary gear 34 and the connecting rod 351 connected thereto to rotate, and the motion trajectory of the point O is an approximate triangle. The approximate triangle is an equilateral triangle with a side length of $2*(D+A)*\sin60°$. in the practical application of the embodiment, a part or the entire side of one side of the approximate triangle can be used to compress the energy storage medium. The difference from the case where the gear ratio is greater than 2:1 is that the crank needs to rotate more than one turn to obtain a complete approximate triangular trajectory. When the gear ratio is 3:2, the crank needs to rotate 2 turns to obtain the complete trajectory. It should be noted that the degree of approximation between the trajectory of point O and the triangle is related to the ratio between D and A. It is easy to understand from FIG. 43 that when crank 33 is located at 0°, 240°, and 480°, the center O of the engagement shaft 352 is located at the three vertices of the triangle. If now the crank is located at 120°, 360°, 600°, the position of point O is at the midpoint of each corresponding side of the triangle, and a motion trajectory with satisfactory approximation can be obtained, where D=A/3. In FIG. 43, the triangle-like dashed line shows the motion trajectory of point O, and the circle shows the position of some nodes passed by the engagement shaft. The triangle-like solid line shows the approximated polygon.

In general, when the gear ratio is n:(n−1), let $D:A=(1-\cos(180°/n)):(1+\cos(180°/n))$, a motion trajectory with a higher approximation to the n-polygon with a side length of $2*(2/(1+\cos(180°/n°)))*A*\sin(180(1n)$ is obtained. In order to obtain a complete trajectory of the approximate n-polygon, it is necessary to rotate the crank by n−1 turns. It should be noted that the above equations about D:A do not need to be exactly equal, but can be approximately equal, except that the degree of approximation of the motion trajectory of point O with the polygon may change.

From the previous analysis, it can be seen that the motion trajectory of point O is an approximate polygon. If only one of the sides is used to compress the impact unit, then the other sides do no work, and the corresponding crank 33 just idles at these rotation angles, so the efficiency is not high. By connecting multiple planetary gear-idler gear-connecting rod structures to the crank 33, or connecting multiple crank-planetary gear-idler gear-connecting rod structures to the output shaft, multiple compressions of impact element can be achieved by using multiple sides of an approximate polygon and effectively using the rotation angle of the crank.

Figure 24:
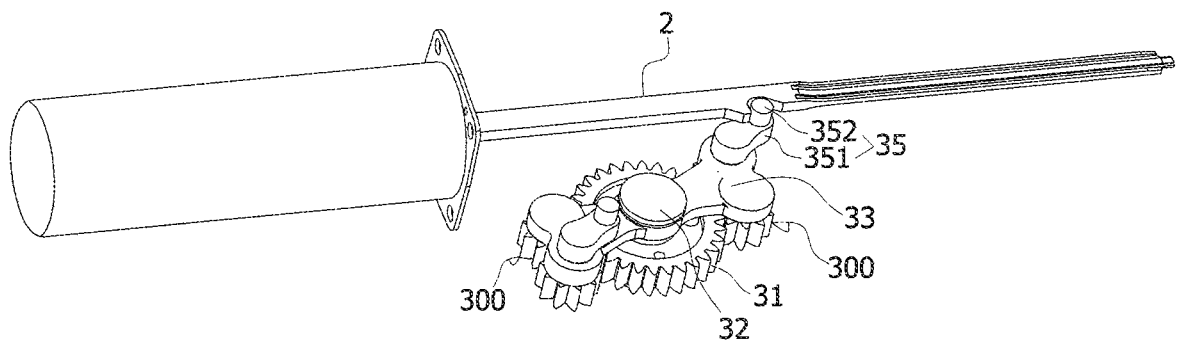
FIG. 24 is a structure diagram of the fourth structure of the present invention (two planetary gear-idler gear-connecting rod assemblies, and gear ratio 3:1)
Figure 25:
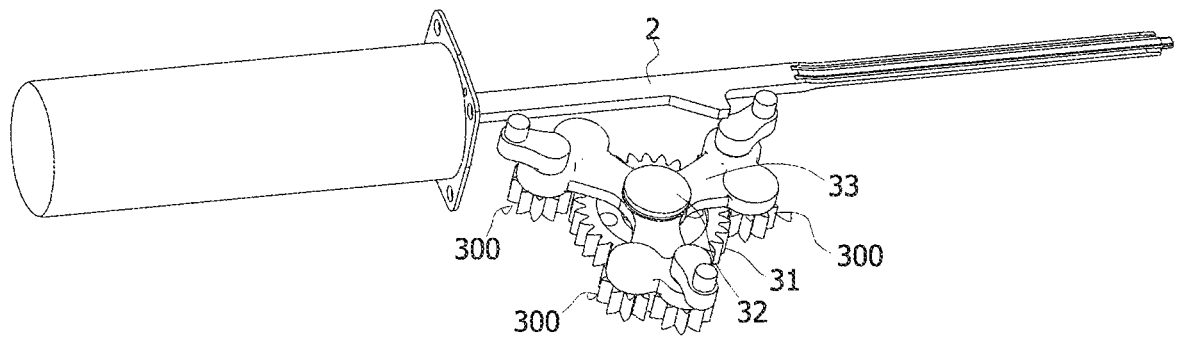
FIG. 25 is a structure diagram of the fifth structure of the present invention (three planetary gear-idler gear-connecting rod assemblies, and gear ratio 3:1)

Take a structure with gear ratio of 3:1 as an example, that is, take the ratio of the reference diameter of the sun gear 31 to the reference diameter of the planetary gear of 3:1 as an example. As shown in FIG. 24, the crank 33 is distributed along the same circumference with two planetary gear-idler gear-connecting rod assemblies 300. Each planetary gear-idler gear-connecting rod 300 includes the planetary gear 34, the idler gear 4, and the connecting rod 351, which are symmetrically distributed at both ends of the crank 33 and placed on both sides of the sun gear 31. Preferably setting the distribution angle of the two planetary gear-idler gear-connecting rod assemblies 300 to be greater than or equal to 120°, the two sides of the approximate triangle can be used to push the impact unit separately. In FIG. 24, it is selected that the included angle of two planetary gear-idler gear-connecting rod assemblies 300 is 180°. When the first planetary gear-idler gear-connecting rod pushes the impact unit to the top dead center, the impact unit under the force of energy storage medium reaches the bottom dead center and the crank continues to rotate, then the second planetary gear-idler gear-connecting rod can mesh with the impact unit to push it to compress the energy storage medium. It is easy to understand that when the crank rotates one circle, there can be two 120°, that is, a total of 240° for doing work, so the efficiency is improved. As shown in FIG. 25, the crank 33 is distributed along the same circumference with three planetary gear-idler gear-connecting rod assemblies 300. The distribution angle of the three planetary gear-idler gear-connecting rod assemblies 300 is preferably set to be equal to 120°, thereby maximizing the use of the three sides of the approximate triangle to push the impact unit separately. It is possible to continue to increase the number of planetary gear-idler gear-connecting rod, but this will result in the distribution angle between the planetary gear-idler gear-connecting rod assemblies less than 120° and an overlap between the pushing stroke of the planetary gear-idler gear-connecting rod, which is not conducive to the improvement of efficiency. Therefore, the number of the planetary gear-idler gear-connecting rod is preferably set to be less than or equal to 3.

Figure 26:
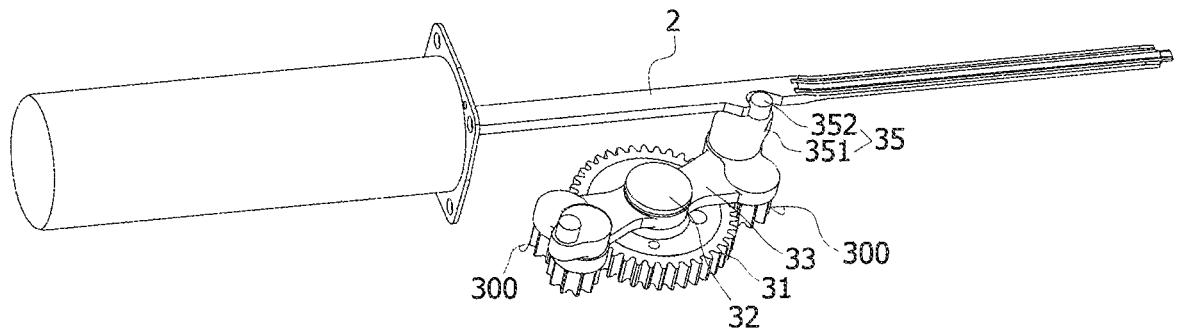
FIG. 26 is a structure diagram of the sixth structure of the present invention (two planetary gear-idler gear-connecting rod assemblies, and gear ratio 4:1)
Figure 27:
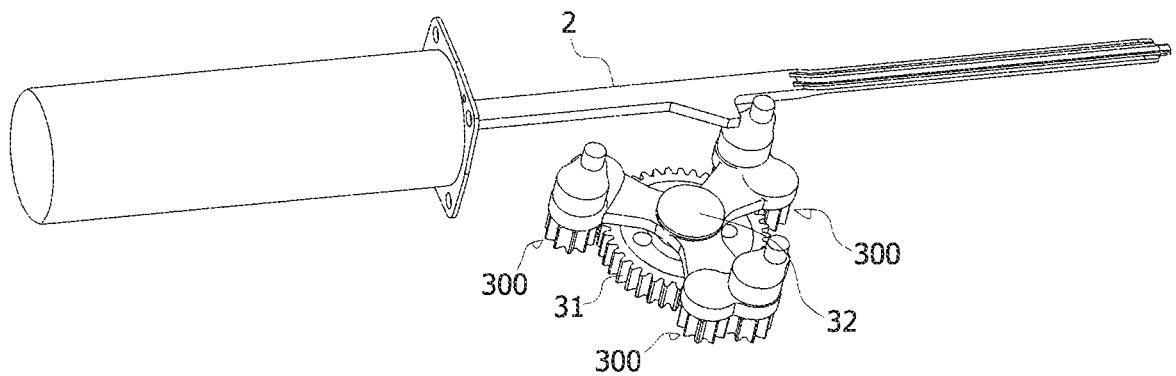
FIG. 27 is a structure diagram of the sixth structure of the present invention (three planetary gear-idler gear-connecting rod assemblies, and gear ratio 4:1)
Figure 28:
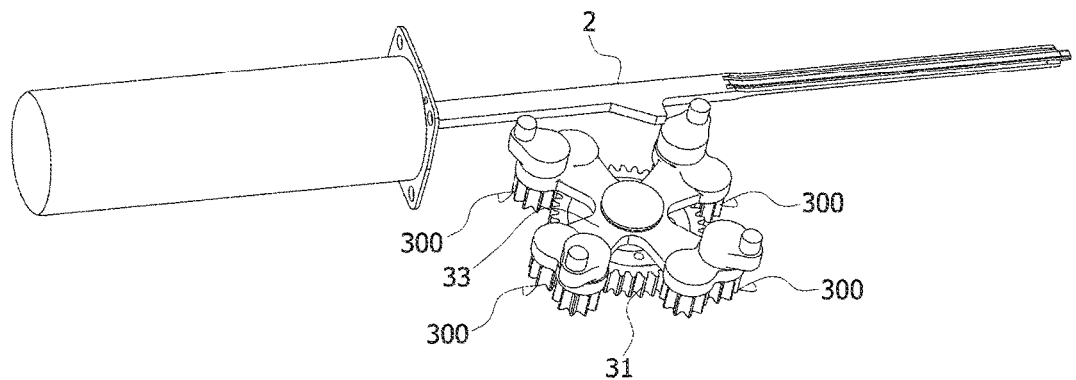
FIG. 28 is a structure diagram of the sixth structure of the present invention (four planetary gear-idler gear-connecting rod assemblies, and gear ratio 4:1)
Figure 29:
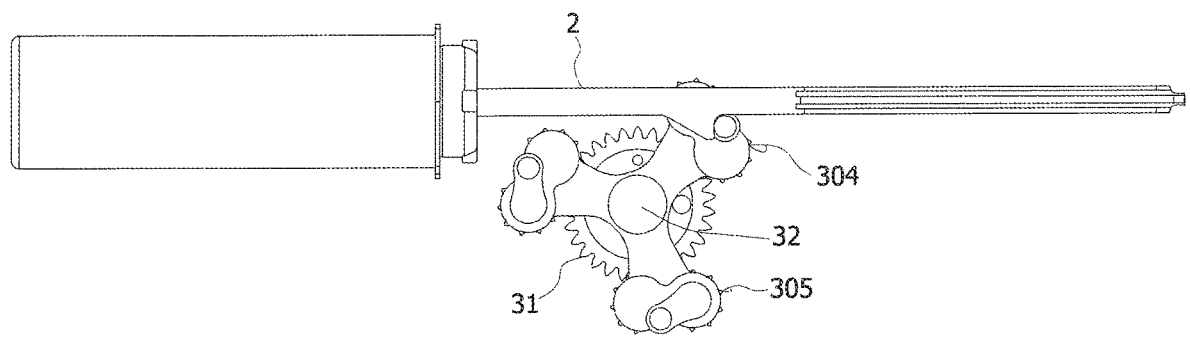
FIG. 29 is a schematic diagram of the working state 1 in FIG. 25.
Figure 30:
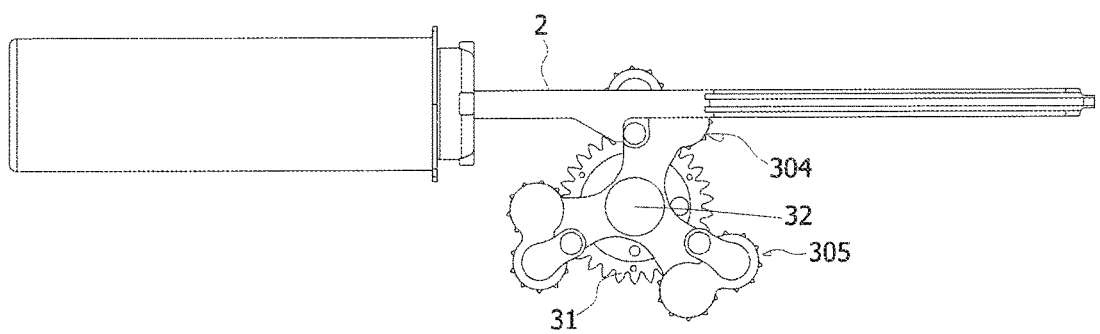
FIG. 30 is a schematic diagram of the working state 2 in FIG. 25.

Similarly, when the gear ratio is 4:1, that is, when the ratio of the reference diameter of the sun gear 31 to the reference diameter of the planetary gear is 4:1, the crank 33 can be distributed along the same circumference with two, three, or four planetary gear-idler gear-connecting rod assemblies 300, as shown in FIGS. 26-28, and preferably setting the distribution angle of the planetary gear-idler gear-connecting rod assemblies 300 to be greater than or equal to 90°. As shown in FIG. 26, the crank 33 is distributed along the same circumference with two planetary gear-idler gear-connecting rod assemblies 300. The distribution angle of the two planetary gear-idler gear-connecting rod assemblies 300 is preferably greater than or equal to 90°, here selecting 180°, then the two sides of the approximate quadrilateral can be totally used to push the impact unit separately. As shown in FIG. 27, the crank 33 is distributed along the same circumference with three planetary gear-idler gear-connecting rod assemblies 300. The distribution angle of the three planetary gear-idler gear-connecting rod assemblies 300 is preferably greater than or equal to 90°, here selecting 120°, then the three sides of the approximate quadrilateral can be totally used to push the impact unit separately. As shown in FIG. 28, the crank 33 is distributed along the same circumference with four planetary gear-idler gear-connecting rod assemblies 300. The distribution angle of the four planetary gear-idler gear-connecting rod assemblies 300 is preferably equal to 90°, here selecting 90°, thereby maximizing the use of the four sides of the approximate quadrilateral to push the impact unit separately. It is possible to continue to increase the number of planetary gear-idler gear-connecting rod, but this will result in the distribution angle between the elements less than 90° and an overlap between the pushing stroke of the planetary gear-idler gear-connecting rod 300, which is not conducive to the improvement of efficiency. Therefore, the number of the planetary gear-idler gear-connecting rod 300 is preferably set to be less than or equal to 4.

It is easy to draw a general inference that when the gear ratio (that is, the ratio of the reference diameter of the sun gear 31 to the reference diameter of the planetary gear) is n:1, multiple planetary gear-idler gear-connecting rod assemblies 300 can be distributed in the driving mechanism. It is preferable to make the number of the planetary gear-idler gear-connecting rod 300 less than or equal to n, and preferable to make the distribution angle greater than or equal to 360/n°. As opposed to only one planetary gear-idler gear-connecting rod 300, efficiency of the driving mechanism 3 can be improved.

Figure 31:
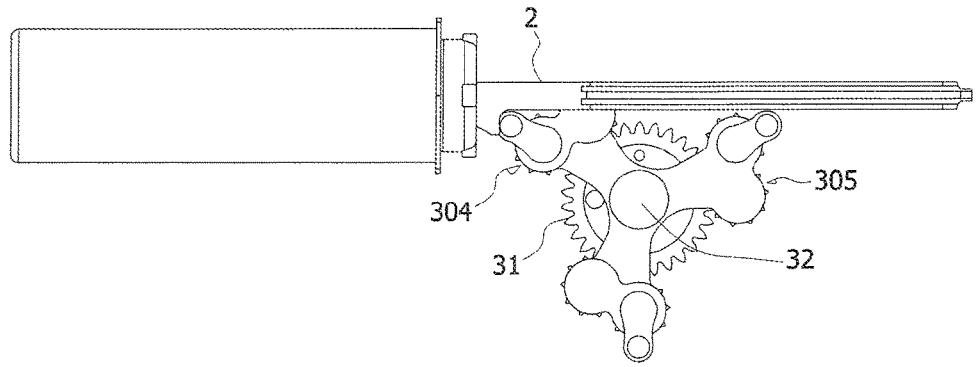
FIG. 31 is a schematic diagram of the working state 3 in FIG. 25.
Figure 32:
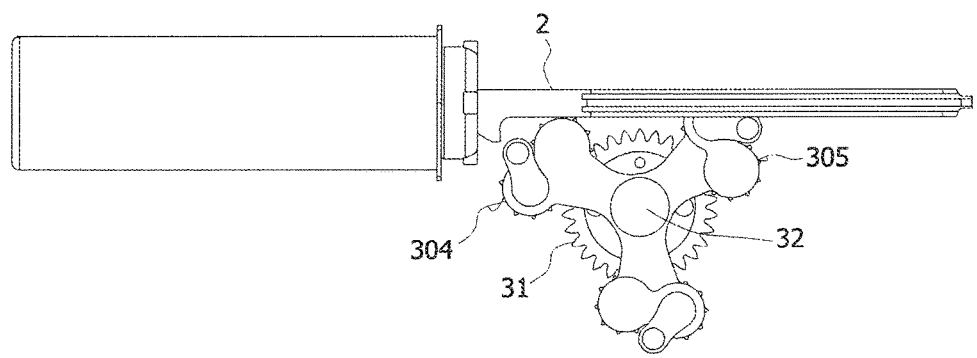
FIG. 32 is a schematic diagram of the working state 4 in FIG. 25.
Figure 33:
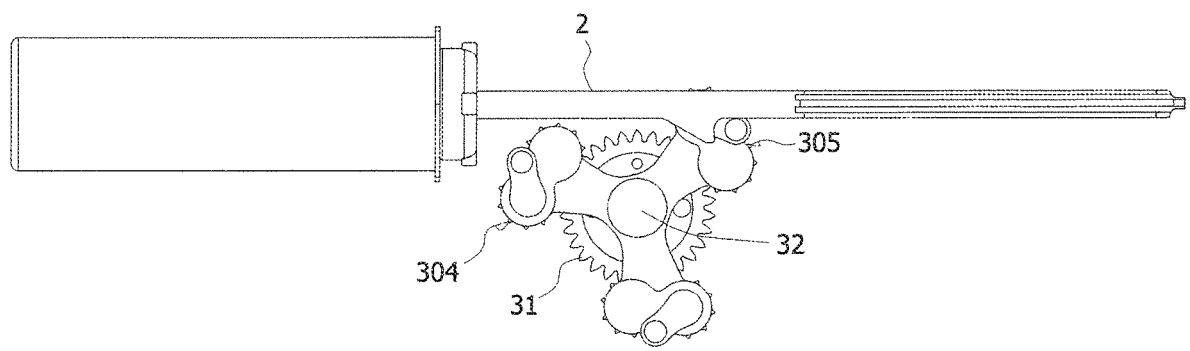
FIG. 33 is a schematic diagram of the working state 5 in FIG. 25.

As for the operation principle and process of the driving mechanism, here only the gear ratio (that is, the ratio of the reference diameter of the sun gear 31 to the reference diameter of the planetary gear) of 3:1 and the circumference distributed with three planetary gear-idler gear-connecting rod assemblies 300 are taken as an example for illustration. As shown in FIGS. 29-33, suppose that the output shaft 32 counterclockwise drives the crank 33 to rotate. When the crank rotates to the state 1, see FIG. 29, the impact unit 2 is at the bottom dead center, and the first planetary gear-idler gear-connecting element 304 begins to mechanically engage with the impact unit. The crank continues to rotate, and the driving mechanism uses one side of the approximate triangle to push the impact unit to compress the energy storage medium from state 1 to state 3 in that order, see FIGS. 29-31, for energy storage. When the impact unit 2 reaches near the top dead center (state 3), as shown in FIG. 31, the crank 33 continues to rotate, and the first planetary gear-idler gear-connecting element 304 moves along the other side of the approximate triangle, thereby achieving the disconnection of the connecting rod and the impact unit (state 4), as shown in FIG. 32. When the connecting rod is separated from the impact unit, the impact unit 2 does work under the thrust of the energy storage medium 1 (state 5), as shown in FIG. 33, completing a work cycle. The crank 33 continues to rotate, and the second planetary gear-idler gear-connecting rod 305 begins to mechanically engage with the impact unit, thereby repeating states 1 to 5 to complete the second work cycle. By the same token, one revolution of the output shaft can complete three work cycles.

Similarly, when the gear ratio (that is, the ratio of the reference diameter of the sun gear 31 to the reference diameter of the planetary gear) is 4:1 and the circumference distributed with four planetary gear-idler gear-connecting rod assemblies 300, one revolution of the output shaft 32 can complete four work cycles. In general, gear ratio of n:1 and the circumference distributed with less than or equal to n planetary gear-idler gear-connecting rod assemblies one revolution of the output shaft can complete less than or equal to n work cycles.

Figure 34:
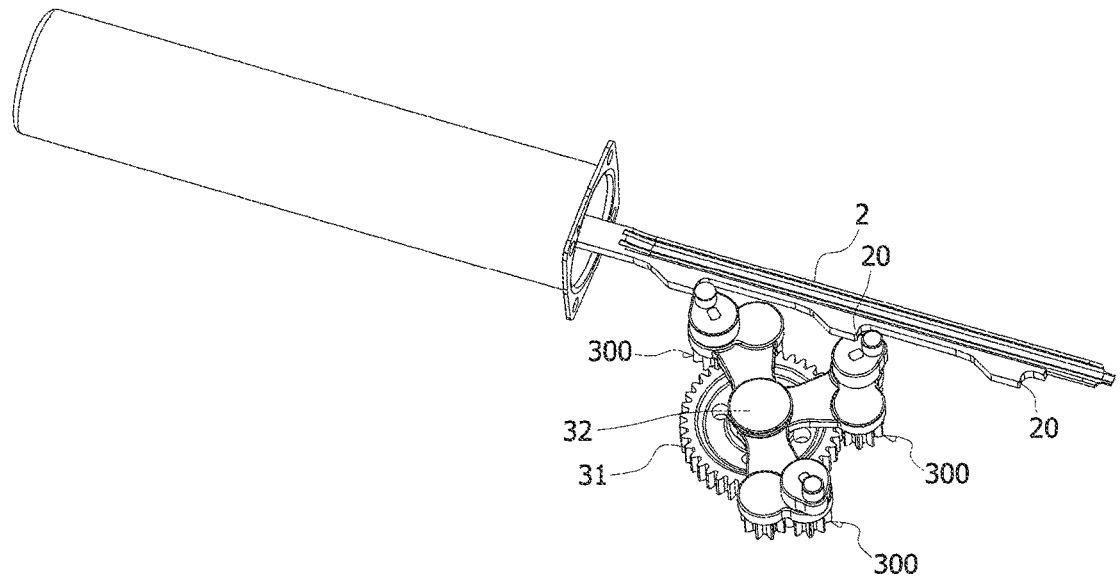
FIG. 34 is the structure diagram of the seventh structure of the present invention (three planetary gear-idler gear-connecting rod assemblies, and gear ratio 4:1)
Figure 35:
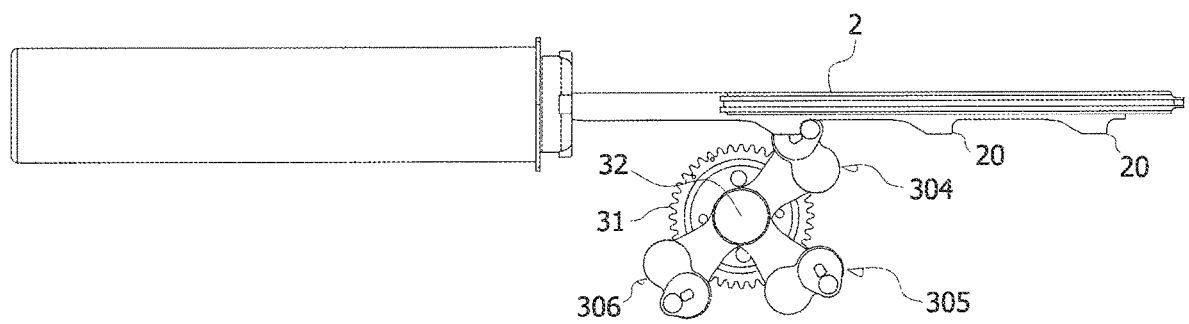
FIG. 35 is a schematic diagram of the working state 1 in FIG. 34.
Figure 36:
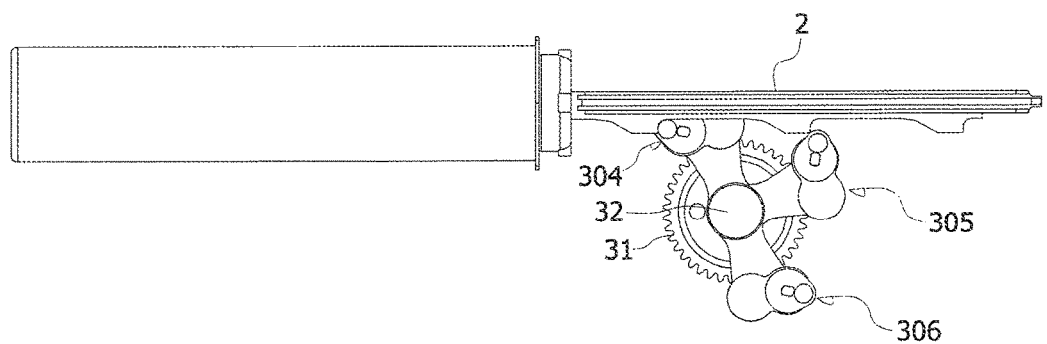
FIG. 36 is a schematic diagram of the working state 2 in FIG. 34.

In the previous embodiments of multiple planetary gear-idler gear-connecting rod assemblies 300, each planetary gear-idler gear-connecting rod can accomplish a complete compression stroke, and one revolution of the output shaft 32 can complete less than or equal to n work cycles. In fact, it is also possible to design multiple planetary gear-idler gear-connecting rod assemblies 300 to jointly complete a compression stroke. As shown in FIG. 34, each planetary gear-idler gear-connecting rod 300 completes a section of the compression stroke, and each section of the stroke successively accomplishes a complete compression stroke. In order to smoothly achieve the relay of each section of the stroke, the impact unit needs to provide with feature that meshes with each planetary gear-idler gear-connecting rod (e.g. the above-mentioned groove 20), and also needs to select appropriate distribution angle of the planetary gear-idler gear-connecting rod assemblies.

Figure 37:
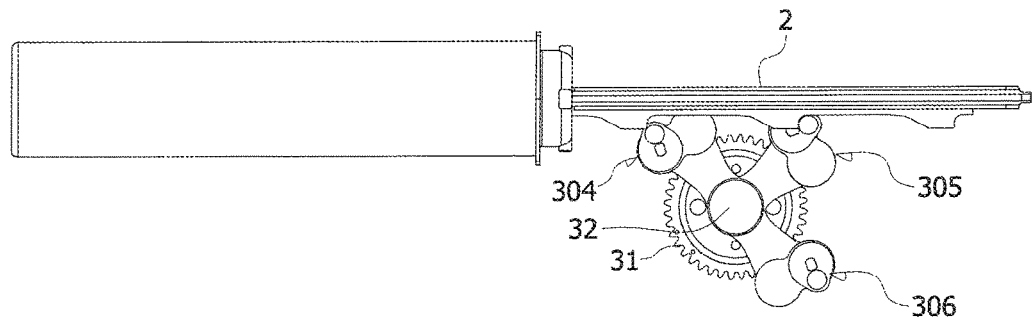
FIG. 37 is a schematic diagram of the working state 3 in FIG. 34.
Figure 38:
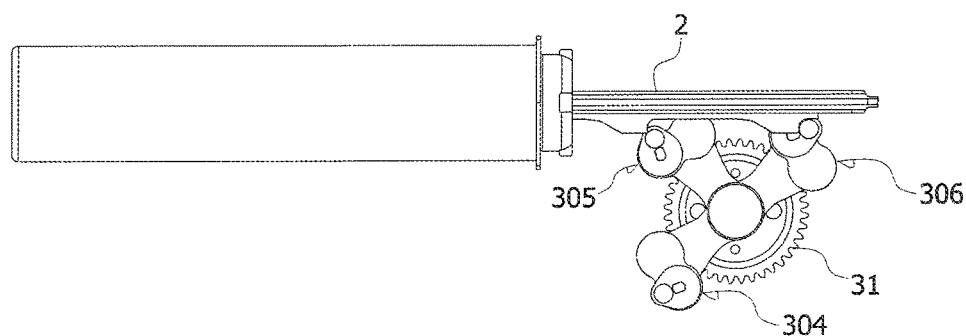
FIG. 38 is a schematic diagram of the working state 4 in FIG. 34.
Figure 39:
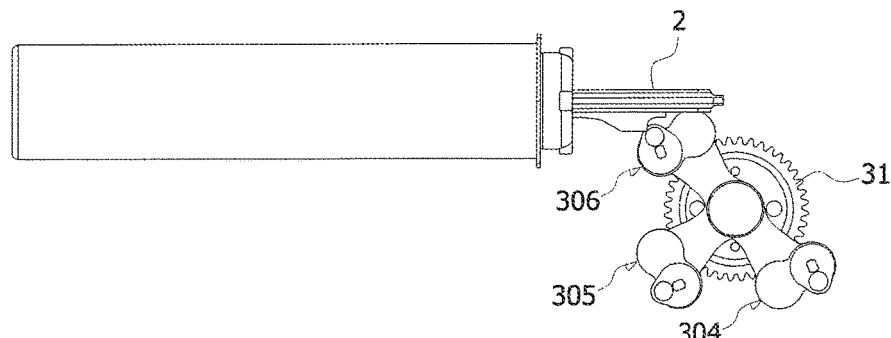
FIG. 39 is a schematic diagram of the working state 5 in FIG. 34.
Figure 40:
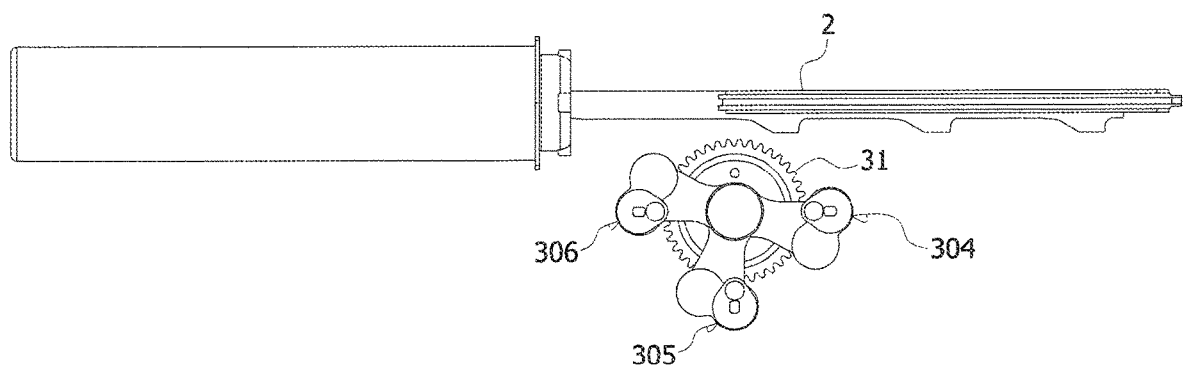
FIG. 40 is a schematic diagram of the working state 6 in FIG. 34.

Take the gear ratio of 4:1 as an example, that is, the ratio of the reference diameter of the sun gear 31 to the reference diameter of the planetary gear of 4:1 as an example, the circumference can be distributed with multiple strokes of planetary gear-idler gear-connecting rod assembly. It is preferable to use the number of the assembly to be less than or equal to 4, more than that number is not conducive to the improvement of driving efficiency. With reference to FIGS. 34-40, three planetary gear-idler gear-connecting rod assemblies are chosen to distribute on the circumference, and the included angle of each element is 90°. The remaining 90° is taken as an avoidance angle to prevent the impact unit from collision with the driving mechanism when moving outwards to do work. The impact unit is provided with three zigzag features 20 that mesh with each planetary gear-idler gear-connecting rod. The choice of the avoidance angle is related to the rotation speed of the crank and the moving speed of the impact unit doing external work. It is easy to deduce that when the gear ratio is n:1, the planetary gear-idler gear-connecting rod assembly with number less than or equal to n can be distributed on the circumference. Suppose the avoidance angle is θ, and the number of the planetary gear-idler gear-connecting rod assembly is m, then the included angle of assembly is preferably chosen as (360°−θ)/m. It should be noted that the included angles between the planetary gear-idler gear-connecting rod assemblies are not necessarily equal, but it is preferable to be designed as equal to make the structure simple. Taking the gear ratio of 4:1 as an example, the operation principle is as follows. Suppose that the output shaft 32 counterclockwise drives the crank 33 to rotate. When the crank rotates to the state 1, see FIG. 35, the impact unit 2 is at the bottom dead center, and the first planetary gear-idler gear-connecting rod 304 begins to mechanically engage with the impact unit. The crank continues to rotate, and the driving mechanism uses one side of the approximate quadrilateral to push the impact unit to compress the energy storage medium to state 2, as shown FIG. 36. The crank 33 continues to rotate, and the first planetary gear-idler gear-connecting rod 304 is about to disengage from the impact unit, and the second planetary gear-idler gear-connecting rod 305 begins to mesh with the impact unit (state 3), as shown in FIG. 37. The crank 33 continues to rotate, and the second planetary gear-idler gear-connecting rod 305 disengages from the impact unit 2 and the third planetary gear-idler gear-connecting rod 306 meshes with the impact unit 2 (state 4), as shown in FIG. 38. The crank 33 continues to rotate, and the third planetary gear-idler gear-connecting rod 306 pushes the impact unit to near the top dead center (state 5), as shown in FIG. 39. The crank continues to rotate, and the third planetary gear-idler gear-connecting rod 306 moves along the other side of the approximate quadrilateral, thereby achieving the disconnection of the connecting rod from the impact unit (state 5), as shown in FIG. 39. When the connecting rod is disconnected from the impact unit, the impact unit 2 does external work under the thrust of the energy storage medium 1 (state 6), as shown in FIG. 40, completing a work cycle.

What is claimed is:

1. A quick fastening device comprising:
    an energy storage medium, an impact unit that is connected to the energy storage medium, and a driving mechanism configured to push the impact unit so as to compress the energy storage medium for energy storage;
    wherein the driving mechanism comprises a fixed sun gear, an output shaft rotatably passing through the fixed sun gear, a crank fixed on an upper end of the output shaft, a planetary gear installed on the crank in a spinning manner and capable of revolving around the fixed sun gear as the crank rotates, and a connecting rod module mounted on an upper end of the planetary gear and connected to the impact unit;
    wherein a linkage element is arranged between the planetary gear and the fixed sun gear for driving the planetary gear to rotate in a direction opposite to a direction in which the planetary gear revolves relative to the fixed sun gear.

2. The quick fastening device of claim 1, wherein an angle of rotation and an angle of revolution of the planetary gear are the same.

3. The quick fastening device of claim 1, wherein a ratio of a reference diameter of the fixed sun gear to a reference diameter D2 of the planetary gear is 2:1.

4. The quick fastening device of claim 1, wherein the linkage element is an idler gear, wherein the idler gear is installed on the crank in a self-rotating manner, and is located between the fixed sun gear and the planetary gear, wherein the idler gear meshes with the fixed sun gear and the planetary gear.

5. The quick fastening device of claim 1, wherein the linkage element is a belt or a chain, wherein the belt or the chain surrounds the fixed sun gear and the planetary gear.

6. The quick fastening device of claim 1, wherein the connecting rod module comprises a connecting rod mounted on the upper end of the planetary gear, wherein the connecting rod is provided with an engagement shaft, wherein the engagement shaft is connected to the impact unit.

7. The quick fastening device of claim 1, wherein the connecting rod module comprises a connecting rod fixed to the upper end of the planetary gear and linked with the planetary gear, and a swing rod mounted on an upper end of the connecting rod and rotatable relative to the connecting rod, wherein the swing rod is provided with an engagement shaft.

8. The quick fastening device of claim 6, wherein the quick fastening device comprises a disengagement assembly for driving the impact unit to disengage with the engagement shaft.

9. The quick fastening device of claim 8, wherein the disengagement assembly comprises a first rotation shaft and a disengagement block mounted on an upper end of the first rotation shaft; or the disengagement assembly comprises a first rotation shaft and a disengagement block integrally fixed to an upper end of the first rotation shaft.

10. The quick fastening device of claim 6, wherein the impact unit is an impact rod, wherein a side of the impact rod is provided with a groove, and the engagement shaft is placed in the groove to form a connection; or a side of the impact rod is provided with a bulge, and the engagement shaft abuts against the bulge to form a connection.

11. The quick fastening device of claim 1, wherein a ratio of a reference diameter of the fixed sun gear to that of the planetary gear is (3:1)-(8:1), or a ratio of a reference diameter of the fixed sun gear to a reference diameter D2 of the planetary gear is (1.1:1)-(1.5:1).

12. The quick fastening device of claim 1, wherein a ratio of an angle of rotation and an angle of revolution of the planetary gear is (2:1)-(7:1) or (0.1:1)-(0.5:1).

13. The quick fastening device of claim 7, further comprising a disengagement assembly for driving the impact unit to disengage with the engagement shaft.

14. The quick fastening device of claim 13, wherein the disengagement assembly comprises a first rotation shaft and a disengagement block mounted on an upper end of the first rotation shaft; or the disengagement assembly comprises a first rotation shaft and a disengagement block integrally fixed to an upper end of the first rotation shaft.

15. The quick fastening of claim 7, wherein the impact unit comprises an impact rod, wherein a side of the impact rod is provided with a groove, and the engagement shaft is placed in the groove to form a connection; or a side of the impact rod is provided with a bulge, and the engagement shaft abuts against the bulge to form a connection.

\* \* \* \* \*